US012175825B2

(12) United States Patent
Ohtomo et al.

(10) Patent No.: US 12,175,825 B2
(45) Date of Patent: Dec. 24, 2024

(54) METHOD, SYSTEM AND COMPUTER READABLE MEDIUM FOR COIN DISCRIMINATION

(71) Applicant: ASAHI SEIKO CO., LTD., Tokyo (JP)

(72) Inventors: Hiroshi Ohtomo, Saitama (JP); Koji Sano, Saitama (JP)

(73) Assignee: ASAHI SEIKO CO., LTD., Tokyo (JP)

( * ) Notice: Subject to any disclaimer, the term of this patent is extended or adjusted under 35 U.S.C. 154(b) by 299 days.

(21) Appl. No.: 16/374,290

(22) Filed: Apr. 3, 2019

(65) Prior Publication Data

US 2019/0311565 A1 Oct. 10, 2019

(30) Foreign Application Priority Data

Apr. 6, 2018 (JP) ................................ 2018-074227

(51) Int. Cl.
*G07F 5/08* (2006.01)
*G07D 1/00* (2006.01)
(Continued)

(52) U.S. Cl.
CPC ................ *G07D 5/08* (2013.01); *G07D 1/00* (2013.01); *G07D 11/22* (2019.01); *G07D 11/60* (2019.01);
(Continued)

(58) Field of Classification Search
CPC . G07D 5/08; G07D 11/22; G07D 1/00; G07D 2205/0011; G07D 11/28;
(Continued)

(56) References Cited

U.S. PATENT DOCUMENTS 5,067,604 A * 11/1991 Metcalf .................... G07D 5/08 194/317
5,167,313 A * 12/1992 Dobbins ................ G07F 1/044 194/317
(Continued)

FOREIGN PATENT DOCUMENTS

EP 1324279 A1 7/2003
JP H06-309544 A 11/1994
(Continued)

OTHER PUBLICATIONS

Extended European Search Report issued in European Patent Office (EPO) Patent Application No. 19159812.7, dated Nov. 7, 2019.
(Continued)

*Primary Examiner* — Jeffrey A Shapiro
(74) *Attorney, Agent, or Firm* — GREENBLUM & BERNSTEIN, P.L.C.

(57) ABSTRACT

A coin discrimination system eliminates the task of visiting the location of an existing coin depositing/dispensing machine to exchange an existing coin discrimination apparatus incorporated in the machine for a new one and the task of additionally setting a new coin discrimination criterion manually to the existing apparatus. Pieces of specific information from pieces of sensor information are compared with pieces of current discrimination criterion information, conducting authenticity and denomination discrimination of coins. New discrimination criterion information setting coins are selected through judgement on whether the denomination of each coin is consistent with a target denomination and judgement on whether each coin is suitable for generating new discrimination criterion information while conducting the authentication and denomination discrimination. A piece of new specific information is extracted from the pieces of sensor information about the setting
(Continued)

coins. The piece of new discrimination criterion information is set using the piece of new specific information.

30 Claims, 13 Drawing Sheets

(51) Int. Cl.
*G07D 5/08* (2006.01)
*G07D 11/22* (2019.01)
*G07D 11/60* (2019.01)
*G07F 11/22* (2006.01)

(52) U.S. Cl.
CPC ................ *G07D 2205/0011* (2013.01); *G07D 2205/0012* (2013.01)

(58) Field of Classification Search
CPC ............... G07D 3/14; G07D 2205/001; G07D 2205/0012; G07D 7/2075; G07D 7/2083; G07D 7/2091; G07D 5/00; G07D 5/005; G07D 5/02; G07D 5/04; G07D 5/06; G07D 5/10
See application file for complete search history.

(56) References Cited

U.S. PATENT DOCUMENTS 5,730,272 A * 3/1998 Dobbins .................. G07D 5/02 194/317
5,931,277 A * 8/1999 Allan ....................... G07D 5/00 194/317
5,971,128 A * 10/1999 Billington ................ G07D 5/00 194/317
6,539,083 B1 * 3/2003 Churchman ............. G07D 5/08 194/316
6,830,143 B2 12/2004 King
7,584,833 B2 * 9/2009 Howells ................... G07D 5/08 194/328
8,739,955 B1 * 6/2014 Everhart .................. G07D 5/00 194/207
9,704,323 B2 7/2017 Ohtomo
2002/0074210 A1 * 6/2002 Brandle ................... G07D 3/06 194/334
2003/0121754 A1 * 7/2003 King ........................ G07D 5/00 194/302
2005/0045450 A1 * 3/2005 Geib ....................... G07D 3/121 194/318
2006/0251320 A1 * 11/2006 Diederichs ........... H04N 1/6033 382/165
2006/0254877 A1 * 11/2006 Mulvey .................... G07D 5/00 194/302
2009/0032368 A1 * 2/2009 Hunter ..................... G07D 5/08 194/318
2009/0048803 A1 * 2/2009 Zwieg ...................... G07D 3/16 702/172
2011/0023596 A1 * 2/2011 Fortin ...................... G07D 5/02 73/163
2011/0054666 A1 * 3/2011 Uesaka .................. G07D 11/50 700/213
2011/0184697 A1 * 7/2011 Tada ........................ G07D 5/08 702/173
2011/0255767 A1 * 10/2011 Jenrick .................. G07D 7/187 382/135
2013/0086973 A1 * 4/2013 Martin ..................... G07D 5/00 73/1.79
2015/0070035 A1 * 3/2015 Blau ........................ G07D 5/08 324/693
2017/0053471 A1 * 2/2017 Mizumoto ............. G07D 11/50

FOREIGN PATENT DOCUMENTS

| | | | |
|---|---|---|---|
| JP | H11-203528 | A | 7/1999 |
| JP | 4226315 | B2 | 12/2008 |
| JP | 2015-97001 | A | 5/2015 |
| JP | 2016-115172 | A | 6/2016 |
| TW | 201007625 | A | 2/2010 |
| WO | 85/04037 | A1 | 9/1985 |
| WO | WO2009/025963 | A1 | 2/2009 |
| WO | 2016/171949 | A1 | 10/2016 |

OTHER PUBLICATIONS

Office Action issued in Taiwan family member Patent Appl. No. 108110372 dated Jan. 8, 2020, along with an English translation thereof.
Office Action issued in Chinese counterpart Patent Appl. No. 201910268729.X, dated Nov. 26, 2020, along with an English translation thereof.
Office Action issued in Japanese counterpart Patent Appl. No. 2018-074227, dated Nov. 20, 2020, along with an English translation thereof.

* cited by examiner

SCHEMATIC PLAN VIEW SHOWING STATE OF COIN AND SENSOR

SCHEMATIC CROSS-SECTIONAL VIEW SHOWING STATE OF COIN AND SENSOR

SCHEMATIC PLAN VIEW SHOWING
LAYOUT OF SENSORS

SIGNAL WAVEFORM CHART
OF OIN SENSORS

SIGNAL WAVEFORM CHART OF AUTHENTIC COIN

SIGNAL WAVEFORM CHART OF COUNTERFEIT COIN

SIGNAL WAVEFORM CHART
OF COIN SENSORS

METHOD, SYSTEM AND COMPUTER READABLE MEDIUM FOR COIN DISCRIMINATION

BACKGROUND OF THE INVENTION

1. Field of the Invention

The present invention relates to coin discrimination and more particularly, to a method, a system, and a computer readable medium for coin discrimination that make it possible to eliminate the task of visiting an installation location to exchange an existing coin discrimination apparatus for a new one by a person in charge and the task of additionally setting a new discrimination criterion or criteria for coins to the existing apparatus manually.

In this specification, the term "coin" has a wide meaning that includes not only coins as currency but also coin equivalents such as tokens and medals other than coins as currency, in which the shape of a "coin" is not limited to a circular one and may be a polygonal or any other one.

2. Description of the Related Art

Conventionally, coin depositing/dispensing machines for automatically conducting the depositing and dispensing processes of coins have been known, as disclosed in, for example, Japanese Unexamined Patent Publication No. 2015-097001 issued on May 21, 2015. Coin depositing/dispensing machines of this type are usually configured to do the following actions:

Coins thrown into a coin inlet are separated from each other by a coin separating and delivering section, and the denomination and authenticity of the coins is discriminated by a coin discriminating section. Then, the coins thus discriminated are conveyed individually and distributed into their respective denominations to be stored in a coin storing section by a coin conveying section. Furthermore, designated denominations and designated numbers of the coins are selected and taken out of those stored in the coin storing section according to a predetermined dispensing signal (e.g., a dispensing signal for change) and then, dispensed into a coin outlet by a coin dispensing section.

In the coin discriminating section of the aforementioned coin depositing/dispensing machine, not only discrimination of the denomination of the coins but also the authentication thereof are carried out, in which a coin discrimination apparatus having a plurality of coin sensors is used for these two types of discrimination. A configuration of such the coin discrimination apparatus is disclosed in, for example, Japanese Unexamined Patent Publication No. 2016-115172 issued on Jun. 23, 2016. The coin discrimination apparatus of this type is configured so as to discriminate the denomination and authenticity of the respective coins with high accuracy. However, after the installation (i.e., the commencement of use) of the coin discrimination apparatus, there arises a case where the existing discrimination performance (i.e., discrimination accuracy) is desired to be raised or a case where the existing discrimination range is desired to be expanded so as to discriminate newly appeared counterfeit coins. In these two cases, it is necessary to update the control program, i.e., the coin discrimination program, (which may be referred to as "firmware" hereinafter) installed into the existing coin discrimination apparatus to a new one.

To conduct the aforementioned update operation of the firmware, conventionally, a service engineer in charge visits the installation location of an existing coin depositing/dispensing machine and then, exchanges the existing coin discrimination apparatus built in this machine for a new coin discrimination apparatus in which a new firmware was installed. Alternatively, a person in charge manually updates (i.e., overwriting installs) the firmware which was already installed in the existing coin discrimination apparatus and furthermore, conducts the teaching operation. Since the cost for exchanging the coin discrimination apparatus is high, it is usual that the manually updating and teaching of the firmware is chosen. Such the manually updating and teaching operations of the firmware is carried out, for example, in the following way:

Specifically, first, a service engineer in charge prepares a new firmware, a personal computer (which may be referred to as "PC" hereinafter), an application for update, and a predetermined number (usually, 30 for each denomination) of coins of the denominations to be updated (which may be referred to as "target denominations" hereinafter) and then, he/she carries the things thus prepared to visit the installation location of an existing coin depositing/dispensing machine. Following this, he/she connects his/her own PC to the existing coin depositing/dispensing machine, thereby enabling communication between the PC and the machine concerned. Thereafter, he/she manipulates the updating application on his/her PC to update the current firmware installed in the non-volatile storage device that has been built in the coin discrimination apparatus in this machine. Subsequently, he/she manipulates the updating application on his/her PC to change the operation mode of the machine from the normal mode to the teaching mode. In this state, he/she throws the predetermined number of coins of the target denominations, which have been carried by him/her, one by one into the coin depositing/dispensing machine in question, thereby obtaining output signals (which show the information for new discrimination criteria) emitted from the coin sensors built in the coin discrimination apparatus in this machine. Then, due to the operation of the updating application on his/her PC, voltage values (which may be termed "specific values" hereinafter) corresponding to the predetermined discrimination criterion values are acquired based on the waveform signals generated from the output signals thus obtained and the voltage values (i.e., specific values) thus acquired are stored in the non-volatile storage device of the coin discrimination apparatus.

The aforementioned process from the throwing of the coins of the target denominations to the acquisition and storing of the specific values as the new discrimination criterion information is conducted by the updating application for each target denomination. This means that the repeat count of this process is equal to the total number (usually, 30 for each denomination) of the target denominations. Finally, due to the operation of the updating application, an average value of the predetermined number of the specific values that have been obtained for each target denomination is calculated and stored as the new discrimination criteria in the aforementioned non-volatile storage device. In this way, the setting operation of the new discrimination criteria is finally completed.

Subsequently, the service engineer manipulates his/her PC again to change the operation mode of the coin depositing/dispensing machine concerned to the normal mode from the teaching mode. After that, this machine conducts its ordinary coin discrimination operation while using the new discrimination criteria thus added and the current discrimination criteria. In this way, the coin discrimination accuracy of the existing coin depositing/dispensing machine can be raised.

As explained above, there is a problem that the aforementioned firmware updating operation is not only troublesome but also forms a factor that raises the service cost. This problem will become a big one if the aforementioned firmware updating operation is unable to be carried out in an existing coin depositing/dispensing machine. For this reason, there is a need to accomplish the reduction of burden of a service engineer in charge and the decrease of the service cost for firmware updating.

A relevant technique usable for responding the above need is disclosed in, for example, Japanese Patent No. 4226315 issued on Dec. 5, 2008. This Japanese patent discloses a calibration method of a coin inspection machine, in which articles (e.g., coins) that belong to known calibration classes are supplied to a coin receiver in an arbitrary order to obtain measured values. Regarding the coins for calibration, preferably, measured values are normalized using other measured values as the normalization coefficients and then, the Mahalanobis distance is calculated using the measured values thus normalized, thereby classifying the coins for calibration. Moreover, in the case where the completeness check suggests that the measured values have no reliability, the measured values are not used for calibration. It is said that calibration of the coin receiver can be carried out more quickly and more easily than the prior art in this method.

However, the aforementioned calibration method of a coin inspection machine disclosed by the aforementioned Japanese Patent No. 4226315 is used for "calibration" in order to suppress the dispersion or variation of the inspection performance (i.e., coin discrimination performance) of a coin inspection machine. Furthermore, this calibration method does not relate to the addition of a new criterion or criteria to existing criteria. Thus, it is not easy for this method to be applied to the aforementioned firmware updating operation.

SUMMARY OF THE INVENTION

The present invention was created to solve the aforementioned problem, in other words, to respond the aforementioned need.

Accordingly, an object of the present invention is to provide a method, a system, and a computer readable medium for coin discrimination that make it possible to eliminate the task of visiting the installation location of an existing coin depositing/dispensing machine to exchange the existing coin discrimination apparatus incorporated in the machine for a new one and the task of additionally setting a new coin discrimination criterion or criteria manually to the existing coin discrimination apparatus.

Another object of the present invention is to provide a method, a system, and a computer readable medium for coin discrimination that make it unnecessary to stop the ordinary coin discrimination operation of an existing coin discrimination apparatus for the purpose of additionally setting new coin discrimination criterion information, in which additionally setting of new discrimination criterion information for a desired target denomination or denominations can be realized while conducting the authenticity discrimination and the denomination discrimination of coins as currency in circulation, i.e., conducting the normal operation.

Still another object of the present invention is to provide a method, a system, and a computer readable medium for coin discrimination that make it possible to cope with the need of raising the accuracy of authenticity discrimination as occasion may demand by simply designating the denomination that requires additional setting of new discrimination criterion information and the method for extracting new specific information from sensor information, whenever additional setting of the new discrimination criterion information is required.

The above objects together with others not specifically mentioned here will become clear to those skilled in the art from the following description.

According to a first aspect of the present invention, a coin discrimination method is provided, which is a method for authenticity discrimination and denomination discrimination of coins using pieces of sensor information outputted from coin sensors, which comprises:

- comparing respectively pieces of specific information obtained from the pieces of sensor information from the coin sensors that detect coins with corresponding pieces of current discrimination criterion information, thereby conducting authenticity discrimination and denomination discrimination of the coins;
- selecting new discrimination criterion information setting coins from the coins through a first judgement on whether a denomination of each of the coins is consistent with a predetermined target denomination and a second judgement on whether each of the coins is suitable for generation of a piece of new discrimination criterion information;
- extracting a piece of new specific information from at least one of the pieces of sensor information about the new discrimination criterion information setting coins; and
- setting the piece of new discrimination criterion information for the target denomination using the piece of new specific information.

With the coin discrimination method according to the first aspect of the present invention, as explained above, the authenticity discrimination and denomination discrimination of the coins can be conducted by respectively comparing the pieces of specific information about the coins with the corresponding pieces of discrimination criterion information and therefore, circulating coins (i.e., coins as currency in circulation) can be used as the new discrimination criterion information setting coins. This means that it is unnecessary to use "teaching coins" that have been prepared as coins dedicated for teaching for additional setting the piece of new discrimination criterion information for the target denomination. However, the circulating coins are often worn down, damaged, and/or modified during circulation and as a result, they include the coins whose size and/or physical properties have been deviated from those of the newly produced ones. For this reason, the new discrimination criterion information setting coins are selected from the coins through the first judgement on whether the denomination of each of the coins is consistent with the target denomination and the second judgement on whether each of the coins is suitable for generation of the piece of new discrimination criterion information while conducting the authentication discrimination and the denomination discrimination.

Thereafter, the piece of new specific information is extracted from at least one of the pieces of the sensor information about the new discrimination criterion information setting coins selected in the aforementioned manner.

Moreover, the piece of new discrimination criterion information for the target denomination is set using the piece of new specific information.

In this way, additionally setting the piece of new discrimination criterion information for the target denomination to the pieces of current discrimination criterion information can be realized while conducting the normal or ordinary operations for authenticity discrimination and denomination discrimination about the circulating coins.

Accordingly, with the coin discrimination method according to the first aspect of the present invention, the task of visiting the installation location of an existing coin depositing/dispensing machine to exchange the existing coin discrimination apparatus incorporated in the machine for a new one and the task of additionally setting a new coin discrimination criterion or criteria manually to the existing coin discrimination apparatus can be eliminated.

Moreover, it is unnecessary to stop the ordinary coin discrimination operation of an existing coin discrimination apparatus for the purpose of additionally setting new coin discrimination criterion information. In other words, additionally setting of new discrimination criterion information for a desired target denomination or denominations can be realized while conducting the authenticity discrimination and the denomination discrimination of circulating coins, i.e., conducting the normal operation.

Furthermore, since new discrimination criterion information for a desired denomination or denominations can be added to an existing coin discrimination apparatus easily and quickly, it is possible to cope with the need of raising the accuracy of authenticity discrimination as occasion may demand by simply designating the denomination that requires additional setting of new discrimination criterion information and the method for extracting new specific information from sensor information, whenever additional setting of the new discrimination criterion information is required.

In a preferred embodiment of the coin discrimination method according to the first aspect of the present invention, the piece of new discrimination criterion information for the target denomination is generated by averaging the new pieces of specific information about the new discrimination criterion information setting coins.

In another preferred embodiment of the coin discrimination method according to the first aspect of the present invention, when the setting of the piece of new discrimination criterion information of the target denomination is completed, the authenticity discrimination of coins is conducted using the pieces of current discrimination criterion information and the piece of new discrimination criterion information with respect to coins that will be subjected to coin discrimination subsequently without conducing the selection of the new discrimination criterion information setting coins, the extraction of the piece of new specific information, and the setting of the piece of new discrimination criterion information; and wherein the denomination discrimination of coins is conducted using the pieces of current discrimination criterion information.

In still another preferred embodiment of the coin discrimination method according to the first aspect of the present invention, an operation mode where the selection of the new discrimination criterion information setting coins, the extraction of the piece of new specific information, and the setting of the piece of new discrimination criterion information are conducted while conducting the authentication discrimination and the denomination discrimination of coins is defined as a learning mode; and an operation mode where the authentication discrimination and the denomination discrimination of coins are conducted without conducting the selection of the new discrimination criterion information setting coins, the extraction of the piece of new specific information, and the setting of the piece of new discrimination criterion information is defined as a normal mode;

wherein when the setting of the piece of new discrimination criterion information is completed, the learning mode is automatically switched to the normal mode;

and wherein in the normal mode, the authentication discrimination is conducted using the pieces of the current discrimination criterion information and the piece of new discrimination criterion information, and the denomination discrimination is conducted using the pieces of the current discrimination criterion information.

In a further preferred embodiment of the coin discrimination method according to the first aspect of the present invention, an operation mode where the selection of the new discrimination criterion information setting coins, the extraction of the piece of new specific information, and the setting of the piece of new discrimination criterion information are conducted while conducting the authentication discrimination and the denomination discrimination of coins is defined as a learning mode; and an operation mode where the authentication discrimination and the denomination discrimination of coins are conducted without conducting the selection of the new discrimination criterion information setting coins, the extraction of the piece of new specific information, and the setting of the piece of new discrimination criterion information is defined as a normal mode;

wherein whether or not the piece of the new discrimination criterion information has been stored in a predetermined information storing section is searched before the learning mode and the normal mode begins; and the normal mode begins when it is judged that the piece of the new discrimination criterion information has been stored, and the learning mode begins when it is judged that the piece of the new discrimination criterion information has not been stored.

In a further preferred embodiment of the coin discrimination method according to the first aspect of the present invention, an operation mode where the selection of the new discrimination criterion information setting coins, the extraction of the piece of new specific information, and the setting of the piece of new discrimination criterion information are conducted while conducting the authentication discrimination and the denomination discrimination of coins is defined as a teaching mode; and an operation mode where the authentication discrimination and the denomination discrimination of coins are conducted without conducting the selection of the new discrimination criterion information setting coins, the extraction of the piece of new specific information, and the setting of the piece of new discrimination criterion information is defined as a normal mode;

wherein a teaching mode selection screen is displayed on a predetermined state display section before the teaching mode and the normal mode begins; and the teaching mode begins when an instruction to select the teaching mode is given on the teaching mode selection screen, and the normal mode begins when an instruction not to select the teaching mode is given on the teaching mode selection screen.

According to a second aspect of the present invention, a coin discrimination is provided, which is a system for authenticity discrimination and denomination discrimination of coins using pieces of sensor information outputted from coin sensors, which comprises:

authenticity and denomination discrimination means for conducting authenticity discrimination and denomination discrimination of the coins by respectively comparing pieces of specific information obtained from the pieces of sensor information from the from the coin sensors that detect coins with corresponding pieces of current discrimination criterion information (e.g., a sensor information acquisition subsection 141, a specific information extraction subsection 142, an authenticity discrimination subsection 143, and a denomination discrimination subsection 144);

coin selection means for selecting new discrimination criterion setting coins from the coins through a first judgement on whether a denomination of each of the coins is consistent with a predetermined target denomination and a second judgement on whether each of the coins is suitable for generation of a piece of new discrimination criterion information (e.g., a target denomination discrimination subsection **144*a* and a coin suitability discrimination subsection 145**);

new specific information extraction means for extracting a piece of new specific information from at least one of the pieces of the sensor information about the new discrimination criterion information setting coins (e.g., a new specific information extraction subsection 146); and new discrimination criterion information setting means for setting the piece of new discrimination criterion information for the target denomination using the piece of new specific information (e.g., a new discrimination criterion information setting subsection 147).

With the coin discrimination system according to the second aspect of the present invention, as explained above, the authenticity discrimination and denomination discrimination of the coins can be conducted by the authenticity and denomination discrimination means (e.g., a sensor information acquisition subsection 141, a specific information extraction subsection 142, an authenticity discrimination subsection 143, and a denomination discrimination subsection 144) and therefore, circulating coins (i.e., coins as currency in circulation) can be used as the new discrimination criterion information setting coins. This means that it is unnecessary to use "teaching coins" that have been prepared as coins dedicated for teaching for additional setting the piece of new discrimination criterion information for the target denomination. However, the circulating coins are often worn down, damaged, and/or modified during circulation and as a result, they include the coins whose size and/or physical properties have been deviated from those of the newly produced ones. For this reason, the new discrimination criterion information setting coins are selected from the coins through the first judgement on whether the denomination of each of the coins is consistent with the target denomination and the second judgement on whether each of the coins is suitable for generation of the piece of new discrimination criterion information using the coin selection means (e.g., a target denomination discrimination subsection **144*a* and a coin suitability discrimination subsection 145**) while conducting the authentication discrimination and the denomination discrimination.

Thereafter, the piece of new specific information is extracted from at least one of the pieces of the sensor information about the new discrimination criterion information setting coins selected in the aforementioned manner by the specific information extraction means (e.g., a new specific information extraction subsection 146). Moreover, the piece of new discrimination criterion information for the target denomination is set using the piece of new specific information by the new discrimination criterion information setting means on (e.g., a new discrimination criterion information setting subsection 147).

In this way, additionally setting the piece of new discrimination criterion information for the target denomination to the pieces of current discrimination criterion information can be realized while conducting the normal or ordinary operations for authenticity discrimination and denomination discrimination about the circulating coins.

Accordingly, with the coin discrimination system according to the second aspect of the present invention, the task of visiting the installation location of an existing coin depositing/dispensing machine to exchange the existing coin discrimination apparatus incorporated in the machine for a new one and the task of additionally setting a new coin discrimination criterion or criteria manually to the existing coin discrimination apparatus can be eliminated.

Moreover, it is unnecessary to stop the ordinary coin discrimination operation of an existing coin discrimination apparatus for the purpose of additionally setting new coin discrimination criterion information. In other words, additionally setting of new discrimination criterion information for a desired target denomination or denominations can be realized while conducting the authenticity discrimination and the denomination discrimination of circulating coins, i.e., conducting the normal operation.

Furthermore, since new discrimination criterion information for a desired denomination or denominations can be added to an existing coin discrimination apparatus easily and quickly, it is possible to cope with the need of raising the accuracy of authenticity discrimination as occasion may demand by simply designating the denomination that requires additional setting of new discrimination criterion information and the method for extracting new specific information from sensor information, whenever additional setting of the new discrimination criterion information is required.

In a preferred embodiment of the coin discrimination system according to the second aspect of the present invention, the piece of new discrimination criterion information for the target denomination is generated by averaging the new pieces of specific information about the new discrimination criterion information setting coins.

In another preferred embodiment of the coin discrimination system according to the second aspect of the present invention, when the setting of the piece of new discrimination criterion information of the target denomination is completed, the authenticity discrimination of coins is conducted using the pieces of current discrimination criterion information and the piece of new discrimination criterion information with respect to coins that will be subjected to coin discrimination subsequently without conducing the selection of the new discrimination criterion information setting coins, the extraction of the piece of new specific information, and the setting of the piece of new discrimination criterion information; and wherein the denomination discrimination of coins is conducted using the pieces of current discrimination criterion information.

In still another preferred embodiment of the coin discrimination system according to the second aspect of the present invention, an operation mode where the selection of the new discrimination criterion information setting coins, the extraction of the piece of new specific information, and the setting of the piece of new discrimination criterion information are conducted while conducting the authentication discrimination and the denomination discrimination of coins is defined as a learning mode; and an operation mode where the authentication discrimination and the denomination discrimination of coins are conducted without conducting the selection of the new discrimination criterion information setting coins, the extraction of the piece of new specific information, and the setting of the piece of new discrimination criterion information is defined as a normal mode;

wherein when the setting of the piece of new discrimination criterion information is completed, the learning mode is automatically switched to the normal mode;

and wherein in the normal mode, the authentication discrimination is conducted using the pieces of the current discrimination criterion information and the piece of new discrimination criterion information, and the denomination discrimination is conducted using the pieces of the current discrimination criterion information.

In a further preferred embodiment of the coin discrimination system according to the second aspect of the present invention, an operation mode where the selection of the new discrimination criterion information setting coins, the extraction of the piece of new specific information, and the setting of the piece of new discrimination criterion information are conducted while conducting the authentication discrimination and the denomination discrimination of coins is defined as a learning mode; and an operation mode where the authentication discrimination and the denomination discrimination of coins are conducted without conducting the selection of the new discrimination criterion information setting coins, the extraction of the piece of new specific information, and the setting of the piece of new discrimination criterion information is defined as a normal mode;

wherein whether or not the piece of the new discrimination criterion information has been stored in a predetermined information storing section is searched before the learning mode and the normal mode begins; and the normal mode begins when it is judged that the piece of the new discrimination criterion information has been stored, and the learning mode begins when it is judged that the piece of the new discrimination criterion information has not been stored.

In a further preferred embodiment of the coin discrimination system according to the second aspect of the present invention, an operation mode where the selection of the new discrimination criterion information setting coins, the extraction of the piece of new specific information, and the setting of the piece of new discrimination criterion information are conducted while conducting the authentication discrimination and the denomination discrimination of coins is defined as a teaching mode; and an operation mode where the authentication discrimination and the denomination discrimination of coins are conducted without conducting the selection of the new discrimination criterion information setting coins, the extraction of the piece of new specific information, and the setting of the piece of new discrimination criterion information is defined as a normal mode;

wherein a teaching mode selection screen is displayed on a predetermined state display section before the teaching mode and the normal mode begins; and the teaching mode begins when an instruction to select the teaching mode is given on the teaching mode selection screen, and the normal mode begins when an instruction not to select the teaching mode is given on the teaching mode selection screen.

According to a third aspect of the present invention, a non-transitory computer readable medium is provided, which is a medium for authenticity discrimination and denomination discrimination of coins using pieces of sensor information outputted from coin sensors that detect coins, which comprises processes to be executed by a computer, the processes comprises:

comparing respectively pieces of specific information obtained from the pieces of sensor information from the coin sensors that detect coins with corresponding pieces of current discrimination criterion information, thereby conducting authenticity discrimination and denomination discrimination of the coins;

selecting new discrimination criterion information setting coins from the coins through a first judgement on whether a denomination of each of the coins is consistent with a predetermined target denomination and a second judgement on whether each of the coins is suitable for generation of a piece of new discrimination criterion information;

extracting a piece of new specific information from at least one of the pieces of the sensor information about the new discrimination criterion information setting coins; and setting the piece of new discrimination criterion information for the target denomination using the piece of new specific information.

With the coin discrimination medium according to the first aspect of the present invention, because of the same reason as described above for the coin discrimination method according to the first aspect of the present invention, additionally setting the piece of new discrimination criterion information for the target denomination to the pieces of current discrimination criterion information can be realized while conducting the normal or ordinary operations for authenticity discrimination and denomination discrimination about the circulating coins.

Accordingly, with the coin discrimination medium according to the third aspect of the present invention, the task of visiting the installation location of an existing coin depositing/dispensing machine to exchange the existing coin discrimination apparatus incorporated in the machine for a new one and the task of additionally setting a new coin discrimination criterion or criteria manually to the existing coin discrimination apparatus can be eliminated.

Moreover, it is unnecessary to stop the ordinary coin discrimination operation of an existing coin discrimination apparatus for the purpose of additionally setting new coin discrimination criterion information. In other words, additionally setting of new discrimination criterion information for a desired target denomination or denominations can be realized while conducting the authenticity discrimination and the denomination discrimination of circulating coins, i.e., conducting the normal operation.

Furthermore, since new discrimination criterion information for a desired denomination or denominations can be added to an existing coin discrimination apparatus easily and quickly, it is possible to cope with the need of raising the accuracy of authenticity discrimination as occasion may demand by simply designating the denomination that requires additional setting of new discrimination criterion information and the method for extracting new specific information from sensor information, whenever additional setting of the new discrimination criterion information is required.

In a preferred embodiment of the coin discrimination medium according to the third aspect of the present invention, the piece of new discrimination criterion information for the target denomination is generated by averaging the new pieces of specific information about the new discrimination criterion information setting coins.

In another preferred embodiment of the coin discrimination medium according to the third aspect of the present invention, when the setting of the piece of new discrimination criterion information of the target denomination is completed, the authenticity discrimination of coins is conducted using the pieces of current discrimination criterion information and the piece of new discrimination criterion information with respect to coins that will be subjected to coin discrimination subsequently without conducing the selection of the new discrimination criterion information setting coins, the extraction of the piece of new specific information, and the setting of the piece of new discrimination criterion information; and wherein the denomination discrimination of coins is conducted using the pieces of current discrimination criterion information.

In still another preferred embodiment of the coin discrimination medium according to the third aspect of the present invention, an operation mode where the selection of the new discrimination criterion information setting coins, the extraction of the piece of new specific information, and the setting of the piece of new discrimination criterion information are conducted while conducting the authentication discrimination and the denomination discrimination of coins is defined as a learning mode; and an operation mode where the authentication discrimination and the denomination discrimination of coins are conducted without conducting the selection of the new discrimination criterion information setting coins, the extraction of the piece of new specific information, and the setting of the piece of new discrimination criterion information is defined as a normal mode;

wherein when the setting of the piece of new discrimination criterion information is completed, the learning mode is automatically switched to the normal mode;

and wherein in the normal mode, the authentication discrimination is conducted using the pieces of the current discrimination criterion information and the piece of new discrimination criterion information, and the denomination discrimination is conducted using the pieces of the current discrimination criterion information.

In a further preferred embodiment of the coin discrimination medium according to the third aspect of the present invention, an operation mode where the selection of the new discrimination criterion information setting coins, the extraction of the piece of new specific information, and the setting of the piece of new discrimination criterion information are conducted while conducting the authentication discrimination and the denomination discrimination of coins is defined as a learning mode; and an operation mode where the authentication discrimination and the denomination discrimination of coins are conducted without conducting the selection of the new discrimination criterion information setting coins, the extraction of the piece of new specific information, and the setting of the piece of new discrimination criterion information is defined as a normal mode;

wherein whether or not the piece of the new discrimination criterion information has been stored in a predetermined information storing section is searched before the learning mode and the normal mode begins; and the normal mode begins when it is judged that the piece of the new discrimination criterion information has been stored, and the learning mode begins when it is judged that the piece of the new discrimination criterion information has not been stored.

In a further preferred embodiment of the coin discrimination medium according to the third aspect of the present invention, an operation mode where the selection of the new discrimination criterion information setting coins, the extraction of the piece of new specific information, and the setting of the piece of new discrimination criterion information are conducted while conducting the authentication discrimination and the denomination discrimination of coins is defined as a teaching mode; and an operation mode where the authentication discrimination and the denomination discrimination of coins are conducted without conducting the selection of the new discrimination criterion information setting coins, the extraction of the piece of new specific information, and the setting of the piece of new discrimination criterion information is defined as a normal mode;

wherein a teaching mode selection screen is displayed on a predetermined state display section before the teaching mode and the normal mode begins; and the teaching mode begins when an instruction to select the teaching mode is given on the teaching mode selection screen, and the normal mode begins when an instruction not to select the teaching mode is given on the teaching mode selection screen.

BRIEF DESCRIPTION OF THE DRAWINGS

In order that the present invention may be readily carried into effect, it will now be described in detail with criterion to the accompanying drawings.

DETAILED DESCRIPTION OF THE INVENTION

Figure 1:
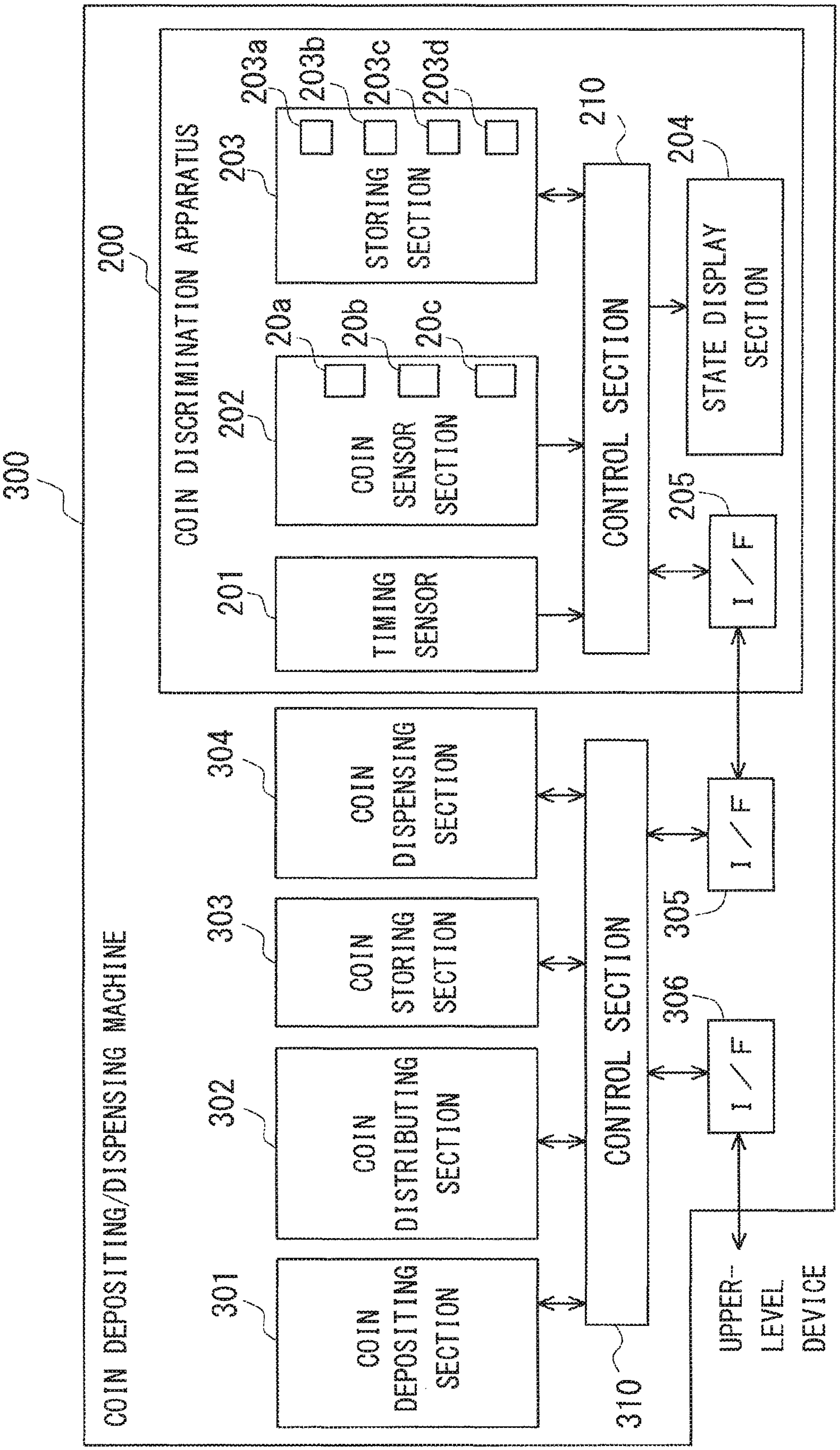
FIG. 1 is a functional block diagram showing the structure of a coin depositing/dispensing machine that includes a coin discrimination apparatus into which a coin discrimination system according to an embodiment of the present invention is incorporated.

Preferred embodiments of the present invention will be described in detail below while referring to the drawings attached.

Figure 2:
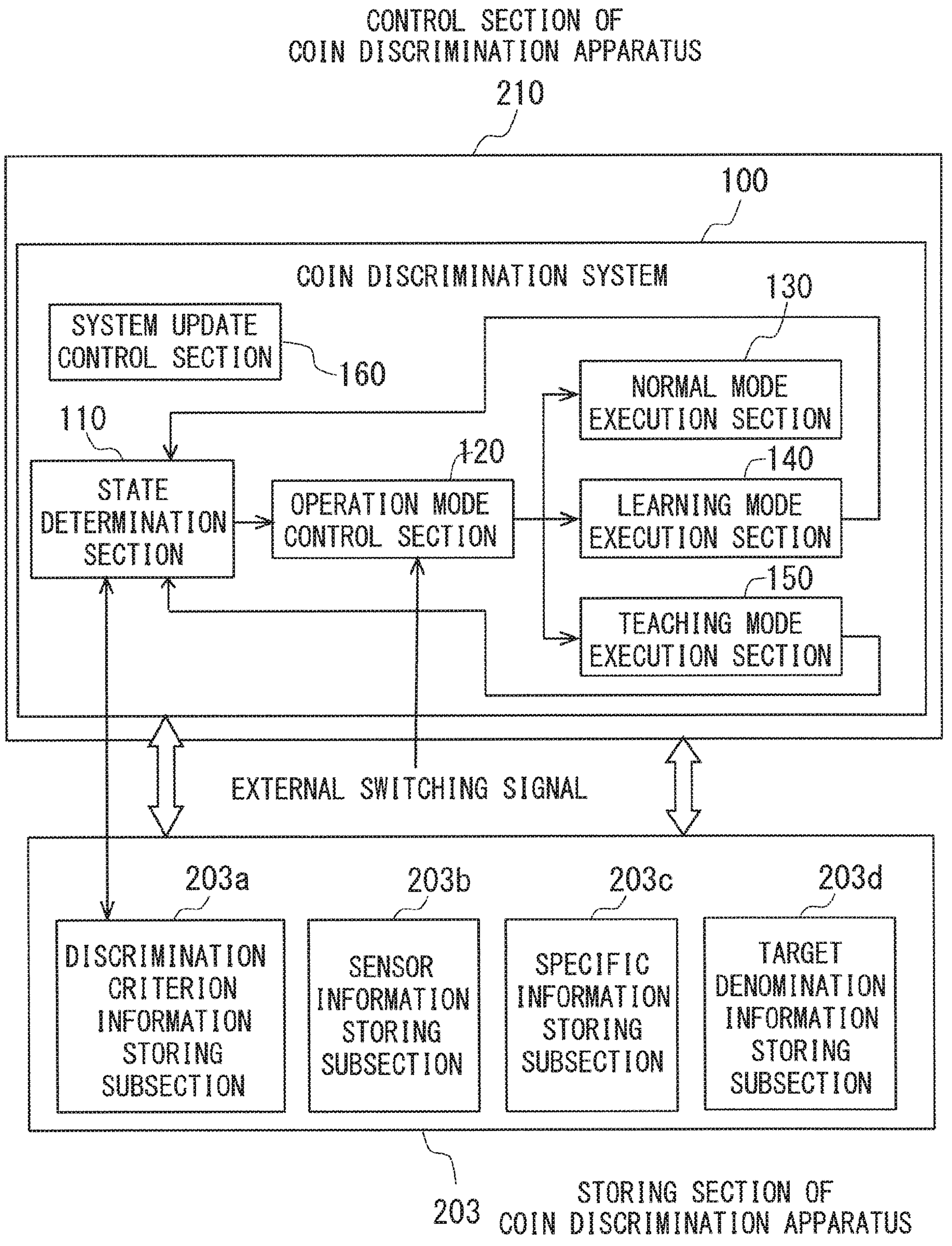
FIG. 2 is a functional block diagram showing the structure of the coin discrimination system according to the embodiment of the present invention, which is incorporated into a control section of the coin discrimination apparatus built in the coin depositing/dispensing machine of FIG. 1.

The structure of a coin discrimination system 100 according to an embodiment of the present invention is shown in FIG. 2 and the structure of a coin depositing/dispensing machine 300 equipped with the coin discrimination system 100 is shown in FIG. 1.

As shown in FIG. 2, the coin discrimination system 100 is incorporated into a control section 210 of a coin discrimination apparatus 200 provided in the coin depositing/dispensing machine 300. The control section 210 is configured, for example, as hardware into which control software is incorporated.

Thus, in the following description, the coin depositing/dispensing machine 300 will be explained first and thereafter, the coin discrimination system 100 will be explained.

Coin Depositing/Dispensing Machine

As shown in FIG. 1, the coin depositing/dispensing machine 300 comprises the coin discrimination apparatus 200 serving as the coin discrimination section of the machine 300, a coin depositing section 301, a coin distributing section 302, a coin storing section 303, a coin dispensing section 304, interfaces (which may be referred to “I/Fs” hereinafter) 305 and 306, and a control section 310.

The control section 310 controls the operations of the coin depositing section 301, the coin distributing section 302, the coin storing section 303, and the coin dispensing section 304. The control section 310 is formed by, for example, hardware in which control software is incorporated. The control section 310 is connected to the coin discrimination apparatus 200 by way of the I/F 305 and signal transmission and reception are possible between the section 310 and the apparatus 200. Thus, the control section 310 can make the operations of the coin depositing section 301, the coin distributing section 302, the coin storing section 303, and the coin dispensing section 304 consistent with the operation of the coin discrimination apparatus 200. Moreover, the control section 310 is connected to an upper-level device (e.g., a cash register, not shown) by way of the I/F 306 and signal transmission and reception are possible between the section 310 and the upper-level device. Thus, the control section 310 can conduct a variety of operations in response to instructions (e.g., coin dispensing instructions) sent from the upper-level device.

The coin depositing section 301 is a section that separates a lot of coins 30 that have been supplied to (thrown into) the coin depositing/dispensing machine 300 through a coin inlet (not shown) from each other to introduce the coins 30 in a desired state or attitude into a coin introducing space (not shown) formed in the machine 300, and that sends the coins 30 which are in the desired state or attitude to the coin discrimination apparatus 200 serving as the coin discrimination section of the machine 300.

The coin discrimination apparatus 200 serving as the coin discrimination section discriminates the denomination and authenticity of each coin 30 conveyed from the coin depositing section 301. If the coin 30 is judged counterfeit, the apparatus 200 generates a predetermined authenticity signal and send this signal to the coin distributing section 302. If the coin 30 is judged authentic or true, the apparatus 200 generates a predetermined authenticity signal and a predetermined denomination signal and send these signals to the coin distributing section 302. The structure and functions of the apparatus 200 will be explained in detail later.

The coin distributing section 302 is a section that distributes the coins 30 (which are limited to those judged authentic) sent from the coin discrimination apparatus 200 in response to the authenticity and denomination signals from the apparatus 200 into their denominations and that sends the coins 30 thus distributed to the coin storing section 303. Regarding the coins 30 that were judged counterfeit in the apparatus 200, the section 302 does not send these counterfeit coins 30 to the coin storing section 303 but discharges them to a dispensing tray (not shown) by way of a dedicated path.

The coin storing section 303 is a section that stores the coins 30 (which are limited to those judged authentic) distributed into their denominations by the coin distributing section 302 in the storing (receiving) boxes prepared for the respective denominations. For example, the section 303 is configured to include storing boxes whose count is equal to the total number of the denominations of the coins 30, in which the coins 30 are stored in the storing boxes corresponding to their respective denominations by way of corresponding distribution gates (not shown) through different paths.

The coin dispensing section 304 is a section that combines appropriately the coins 30 that were stored separately in the coin storing section 303 according to their respective denominations in response to a dispensing instruction sent from the unillustrated upper-level device (e.g., a cash register) and that takes out the coins 30 thus combined to outside (concretely, a dispensing tray).

Coin Discrimination Apparatus

Next, the coin discrimination apparatus 200 will be explained in detail with criterion to FIGS. 1 and 2.

As shown in FIG. 1, the coin discrimination apparatus 200 comprises a timing sensor 201, a coin sensor section 202, a storing section 203, a state display section 204, an I/F 205, and a control section 210.

The timing sensor 201 generates a timing signal (clock signal) for sending information (signals) at a predetermined speed at a predetermined time and supplies the timing signal thus generated to the control section 210. The control section 210 operates in synchronization with the timing signal and controls the operations of the coin sensor section 202, the storing section 203, the display section 204, and the I/F 205 in such a way as to be synchronized with the timing signal. Accordingly, the overall apparatus 200 operates in synchronization with the timing signal (clock signal) generated by the timing sensor 201.

Figure 11:
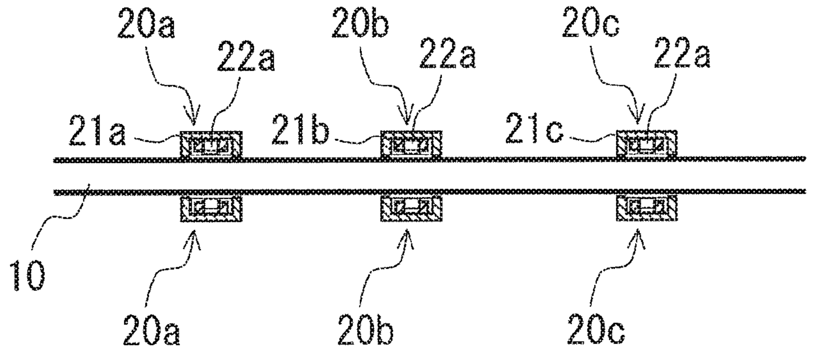
FIG. 11 is a schematic plan view showing the arrangement of first to third coin sensors arranged in a coin sensor section of the coin discrimination apparatus of FIG. 1.

The coin sensor section 202 is a section, which includes a plurality of coin sensors, that detects the passage of each coin 30 to output pieces of sensor information. As shown in FIG. 11, the section 202 comprises a linear coin conveying path 10, a pair of opposing first coin sensors 20*a*, a pair of opposing second coin sensors 20*b*, and a pair of opposing third coin sensors 20*c*, in which the pairs of the first, second, and third coin sensors 20*a*, 20*b*, and 20*c* are arranged along the coin conveying path 10 in this order. One end of the path 10 is connected to a coin conveying path (not shown) formed in the coin depositing section 301. The coins 30 thrown from the coin inlet (not shown) of the coin depositing section 301 are separated from each other and sent to the coin conveying path 10 one by one at intervals. The other end of the path 10 is connected to the coin conveying path (not shown) formed in the coin distributing section 302. After the discrimination of the authenticity and denomination in the coin discrimination apparatus 200 is completed, the coins 30 are sent to the coin distributing section 302 by way of the coin conveying path 10.

Figure 9:
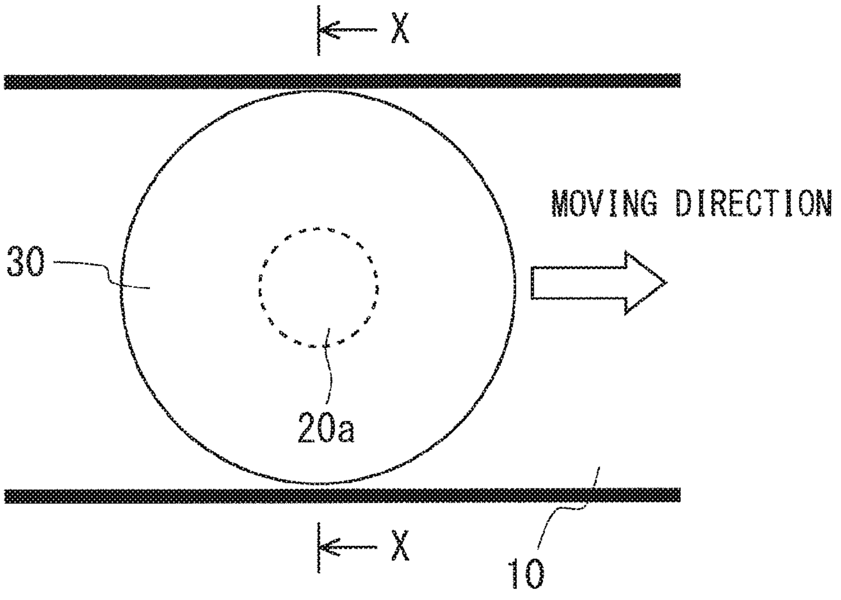
FIG. 9 is a schematic plan view showing a coin passing through a coin conveying path and coin sensors arranged at each side of the path in the coin discrimination apparatus of FIG. 1 that includes the coin discrimination system of FIG. 2.
Figure 10:
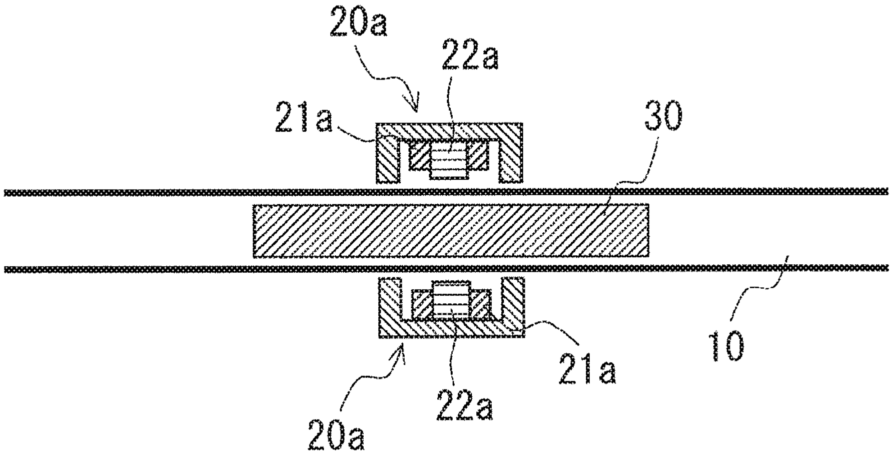
FIG. 10 is a cross-sectional view along the line X-X in FIG. 9.

The pair of first coin sensors 20*a* and the pair of second coins sensors 20*b* are apart from each other at a predetermined distance along the coin conveying path 10. Similarly, the pair of second coin sensors 20*b* and the pair of third coins sensors 20*c* are apart from each other at a predetermined distance along the path 10. One of the pair of first coin sensors 20*a*, one of the pair of second coins sensors 20*b*, and one of the pair of third coins sensors 20*c* are disposed on one side of the path 10 (e.g., on the upper side of the path 10 in FIG. 11), and the other of the pair of first coin sensors 20*a*, the other of the pair of second coins sensors 20*b*, and the other of the pair of third coins sensors 20*c* are disposed on the other side of the path 10 (e.g., on the lower side of the path 10 in FIG. 11). Each coin 30 supplied to the path 10 through the coin depositing section 301 is moved in the direction indicated by the arrow in FIG. 9 through the space between the respective pairs of first, second, and third sensors 20*a*, 20*b*, and 20*c*, in which each coin 30 is kept in the state shown in FIGS. 9 and 10. The pairs of first, second, and third sensors 20*a*, 20*b*, and 20*c* detect the coins 30 and output respectively first, second, and third sensor signals.

The pair of first coin sensors 20*a* has the same structure and each of the sensors 20*a* comprises a core 22*a* and a coil 21*a* wounded around the core 22*a* and an approximately cylindrical shape as a whole. The first coin sensors 20*a* are fixed in such a way that the centers of the sensors 20*a* approximately coincide with the trajectories of the centers of coins 30 that are conveyed on the coin conveying path 10 (see FIGS. 9 and 10). The sensors 20*a* are respectively located at the two sides of the path 10 and detect magnetically the "material" of each coin 30 conveyed along the path 10 in the state where the coin 30 is sandwiched between the sensors 20*a*. This means that the sensors 20*a* are "magnetic sensors" that detect magnetically the "material" of the coin 30. In addition, since the diameter of a coin 30 changes according to the denomination, the centers of the sensors 20*a* may be displaced from those of the coins 30. For this reason, the diameters of the sensor 20*a* are determined in such a way that no hindrance arises in the detection operation of the aforementioned physical property, i.e., the "material" of coins 30, even if such the situation as described here occurs.

The pair of second coin sensors 20*b* has the same structure and each of the sensors 20*b* comprises a core 22*b* and a coil 21*b* wounded around the core 22*b*. Similar to the first coin sensors 20*a*, each of the second coin sensors 20*b* is an approximately cylindrical shape as a whole, and the sensors 20*b* are fixed in such a way that the centers of the sensors 20*b* approximately coincide with the trajectories of the centers of coins 30 that are conveyed on the coin conveying path 10. The sensors 20*b* are respectively located at the two sides of the path 10 and detect magnetically the "thickness" of each coin 30 conveyed along the path 10 in the state where the coin 30 is sandwiched between the sensors 20*b*. This means that the sensors 20*b* are "thickness sensors" that detect magnetically the "thickness" of the coin 30. In addition, since the diameter of a coin 30 changes according to the denomination, the centers of the sensors 20*b* may be displaced from those of the coins 30. For this reason, the diameters of the sensor 20*b* are determined in such a way that no hindrance arises in the detection operation of the aforementioned physical property, i.e., the "thickness" of coins 30, even if such the situation as described here occurs.

The pair of third coin sensors 20*c* has the same structure and each of the sensors 20*c* comprises a core 22*c* and a coil 21*c* wounded around the core 22*c*. Similar to the first and second coin sensors 20*a* and 20*b*, each of the third coin sensors 20*c* is an approximately cylindrical shape as a whole. The sensors 20*c* are fixed in such a way that the sensors 20*c* are overlapped with the coins 30 that are conveyed on the coin conveying path 10. The sensors 20*c* are respectively located at the two sides of the path 10 and detect magnetically the "diameter" of each coin 30 conveyed along the path 10 in the state where the coin 30 is sandwiched between the sensors 20*c*. This means that the sensors 20*c* are "diameter sensors" that detect magnetically the "diameter" of the coin 30. In addition, since the diameter of a coin 30 changes according to the denomination, the degree of overlapping (i.e., the overlapping state) between the sensors 20*c* and the coin 10 may be changed. For this reason, the relative relationship between the sensors 20*c* and the coin 30 is determined in such a way that no hindrance arises in the detection operation of the aforementioned physical property, i.e., the "diameter" of coins 30, even if the aforementioned degree of overlapping is small.

The storing section 203 is a section of storing predetermined information and made by any known memory device. or devices As shown in FIG. 2, the storing section 203 is divided into four subsections, i.e., a discrimination criterion information storing subsection 203*a*, a sensor information storing subsection 203*b*, a specific information storing subsection 203*c*, and a target denomination information storing subsection 203*d*.

The discrimination criterion information storing subsection 203*a* is a subsection in which discrimination criterion information is stored. The discrimination criterion information is determined for each of the denominations of coins 30 (in the case of Japanese Yen, 6 denominations, i.e., 1 Yen, 5 Yen, 10 Yen, 50 Yen, 100 Yen, and 500 Yen). Here, the section 203*a* is configured to store three pieces of discrimination criterion information corresponding to the first, second, and third coin sensors 20*a*, 20*b*, and 20*c* and therefore, three pieces of discrimination criterion information are stored in the subsection 203*a* for each of the denominations at the time of factory shipment. However, taking the necessity of additional setting new pieces of discrimination criterion information into consideration after the time of factory shipment, a region or part for storing new pieces of discrimination criterion information is prepared in the section 203*a*.

Any type of memory devices can be used as the discrimination criterion information storing subsection 203*a*; however, it is preferred that an electrically erasable programmable non-volatile memory device or devices, e.g., an EEPROM (Electrically Erasable Programmable Read-Only Memory) or EEPROMs, is/are used. This is because there is a possibility that the initial pieces of discrimination criterion information, which are set and stored initially, i.e., at the time of factory shipment, may be changed after the beginning of use of the coin discrimination apparatus 200 and that a new piece or pieces of discrimination criterion information is/are added after the beginning of use of the apparatus 200. Sine an EEPROM or EEPROMs can easily cope with such the situations, the pieces of current or existing discrimination criterion information can be changed and a piece or pieces of new discrimination criterion information can be added.

Figure 12:
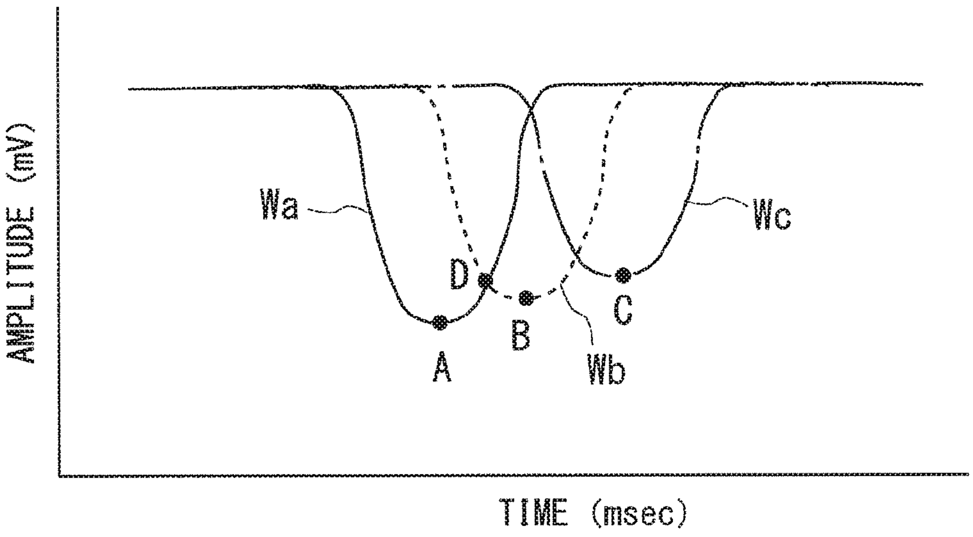
FIG. 12 is an explanatory drawing showing the relationship among three output signal waveforms obtained from the first to third coin sensors disposed in the coin sensor section of the coin discrimination apparatus of FIG. 1.

The sensor information storing subsection 203*b* is a subsection in which pieces of first, second, and third sensor information outputted respectively from the first, second, and third coin sensors 20*a*, 20*b*, and 20*c* are stored. Each of the pieces of first, second, and third sensor information is analog information and their values vary according to the detection of every coin 30. Concretely speaking, for example, each piece of the first, second, and third sensor information is a waveform signal as shown in FIG. 12 and thus, fluctuation parts (valley parts) are generated at different timings due to the passage of each coin 30. This is because the pairs of first, second, and third coin sensors 20*a*, 20*b*, and 20*c* are arranged at predetermined intervals along the linear coin conveying path 10.

It is preferred that any type of a volatile memory device or devices, e.g., a Random Access Memory (RAM) or RAMs, is/are used as the sensor information storing subsection 203*b*. Since the first to third sensor information is utilized to extract first to third specific information and/or new specific information from each coin 30, these information needs to be stored temporarily; however, after extraction of the first to third specific information is completed, they are not necessary. If a RAM or RAMs is/are used as the sensor information storing subsection 203*b*, the first to third sensor information outputted respectively from the pair of first, second, and third coin sensors 20*a*, 20*b*, and 20*c* whenever a plurality of coins 30 are successively conveyed on the coin conveyance path 10 can be overwritten, which results in convenience.

Figure 13A:
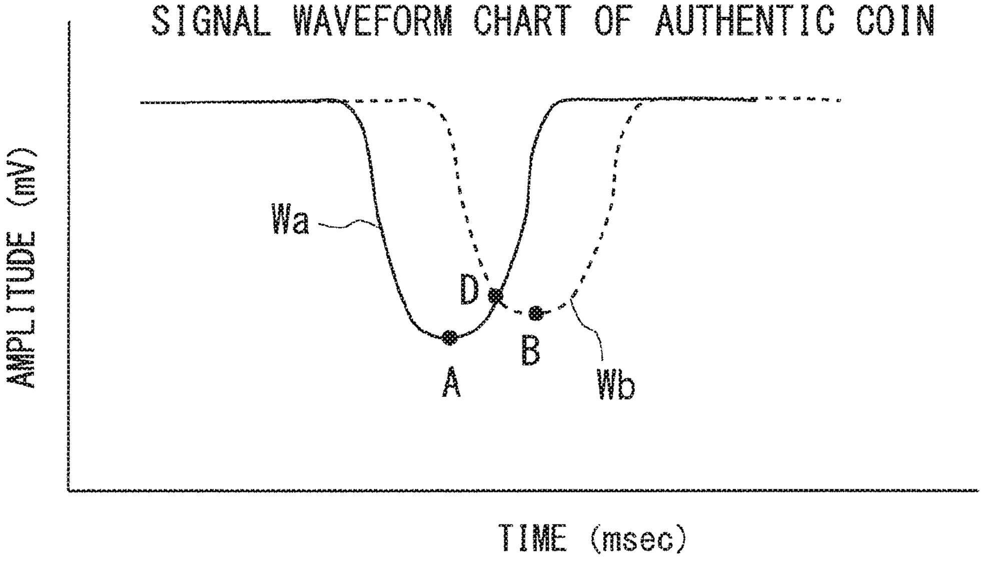
FIG. 13A is an explanatory drawing showing the output signal waveforms from the first and second coin sensors in the coin discrimination apparatus of FIG. 1, in which a coin during conveyance is judged as a true or authentic coin.
Figure 13B:
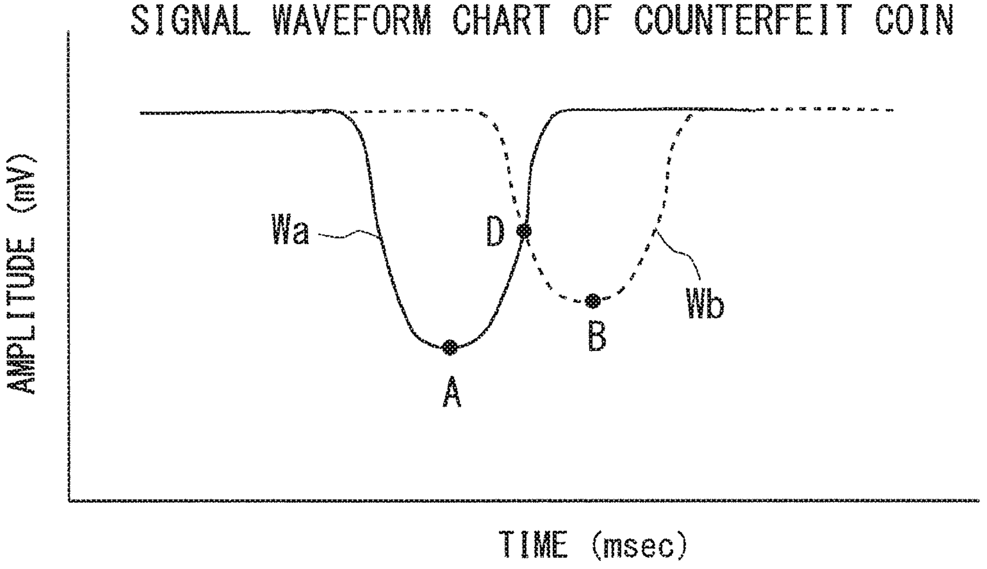
FIG. 13B is an explanatory drawing showing the output signal waveforms from the first and second coin sensors in the coin discrimination apparatus of FIG. 1, in which a coin during conveyance is judged as a counterfeit coin.

The specific information storing subsection 203*c* is a subsection in which the first, second, and third specific information outputted respectively from the first, second, and third coin sensors 20*a*, 20*b*, and 20*c* and the new specific information which is generated based on the first, second, and third specific information of a coin 30 having a predetermined coin suitability are stored. The new specific information is information specific in each coin 30, which is generated using at least one of the first to third coin information and stored in the subsection 203*c*. A dedicated memory area (memory address) is assigned to each of the first, second, and third specific information and the new specific information, and these four kinds of information are respectively stored in the corresponding memory areas. Concretely speaking, for example, if each of the first, second, and third sensor information is expressed in the form of waveform as shown in FIG. 12, the first, second, and third specific information is respectively given by the minimum values (i.e., the points A, B, and C in FIG. 12) of the amplitude (voltage) of the first, second, and third sensor information. The new specific information is given by the value at the intersection of the two waveforms of the first and second sensor information, in other words, the value at which the first and second sensor information have the same amplitude (voltage) value (i.e., the point D in FIG. 12). The authenticity of coins 30 can be discriminated by the position of the point D. For example, if the point D is located at the position (voltage level) shown in FIG. 13A for an authentic coin 30, the point D is shifted to the position (voltage level) shown in FIG. 13B for a counterfeit coin 30. In this way, the authenticity of coins 30 can be discriminated by the position (voltage level) or timing of the point D.

Similar to the discrimination criterion information storing subsection 203*a*, it is preferred that an EEPROM or EEPROMs is/are used as the specific information storing subsection 203*c*. This is because, as explained later, the first to third specific information and the new specific information is extracted for every coin 30, and the new specific information is calculated based on the average of the pieces of new specific information of coins 30 of each target denomination for every prescribed number of coins 30 and therefore, the extracted new specific information needs to be stored until the aforementioned extraction process is completed for the prescribed coin number. The pieces of new discrimination criterion information thus calculated are stored in the discrimination criterion information storage subsection 203*a* in addition to the pieces of current or existing discrimination criterion information.

The target denomination information storage subsection 203*d* is a subsection in which the discrimination result about whether or not each coin 30 is consistent with any one of prescribed target denominations is stored. For example, if additional setting of new discrimination criterion information is necessary for the two denominations of 100 Yen and 500 Yen, which are selected from the 6 denominations of 1 Yen, 5 Yen, 10 Yen, 50 Yen, 100 Yen, and 500 Yen, to the current or existing discrimination criterion information, the target denominations are two denominations of 100 Yen and 500 Yen. As described later, in the learning mode, whether or not the denomination of each coin 30 which is discriminated by the denomination discrimination process accords with any one of the two denominations of 100 Yen and 500 Yen as the target denominations is judged, and the information relating to the judgement result (which may be termed "target denomination discrimination result information" later) is stored whenever necessary.

It is preferred that any type of a volatile memory device or devices (e.g., RAM or RAMs) is/are used as the target denomination information storage subsection 203*d*. This is because the target denomination discrimination result information is used for discriminating the coin suitability for each coin 30 (whether each coin 30 has an aptitude for setting new discrimination criterion information or not), this information needs to be stored temporarily; however, this information will be unnecessary after the aforementioned discrimination of the coin suitability is completed. If a RAM or RAMs is/are used as the storage subsection 203*d*, the target denomination discrimination result information can be overwritten and stored whenever a plurality of coins 30 are successively conveyed on the coin conveying path 10, which results in convenience for users.

The state display section 204 is a section that displays the operation state of the coin discrimination apparatus 200 on the predetermined display area (not shown), thereby notifying the user, administrator, and/or service engineer in charge about the current operation state, the occurrence of errors and so on of the coin discrimination apparatus 200 (the coin depositing/dispensing machine 300). The state display section 204 can be realized using any type of display device, for example, a set of LEDs (Light Emitting Diodes) each emitting different color light or a small-sized LCD (Liquid Crystal Display) panel. Because the state display section 204 is provided, when a counterfeit coin is discovered by the operation of the coin discrimination apparatus 200 or some abnormality occurs in the coin discrimination operation, the current operation state can be immediately notified the user, administrator, and/or service engineer.

The I/F 205 connects the control section 210 of the coin discrimination apparatus 200 to the control section 310 that controls the coin depositing section 301, the coin distributing section 302, the coin storing section 303, and the coin dispensing section 304 by way of the I/F 305 mounted outside the apparatus 200. For this reason, the operation of the apparatus 200 can be controlled so as to be matched with the operations of the coin depositing section 301, the coin distributing section 302, the coin storing section 303, and the coin dispensing section 304.

The control section 210 comprises the coin discrimination system 100, as shown in FIG. 2. In other words, the coin discrimination system 100 is incorporated into the control section 210. Next, the coin discrimination system 100 will be explained in detail below.

Coin Discrimination System

The coin discrimination system 100 according to the embodiment of the present invention prepares three operation modes, i.e., "normal mode", "learning mode" (which is a nonstandard mode), and "teaching mode" (which is also a nonstandard mode). These three operation modes are switchable and selectively executable according to the necessity. Accordingly, the system 100 can be operated in "the normal mode", "the learning mode", or "the teaching mode", which are switchable according to circumstances.

In this embodiment, the coin discrimination system 100 is made of software in its entirety. Thus, if appropriate amendments are added to the current coin discrimination system 100 installed in the control section 210 to form a new version and then, the new version thus formed is installed so as to overwrite the current version, the current coin discrimination system 100 can be updated to amend or improve its current functions.

The overall structure of the coin discrimination system 100 is shown in FIG. 2. The system 100 comprises a state determination section 110, an operation mode control section 120, a normal mode execution section 130, a learning mode execution section 140, a teaching mode execution section 150, and a system update control section 160.

The system update control section 160 is a section that controls the update operation of the coin discrimination system 100. Due to this section 160, automatic update (i.e., overwrite installation of a new version that includes the denomination information indicating new discrimination criterion information to be added) of the system 100 and automatic execution of the learning mode that will be explained later can be performed according to the necessity by receiving a predetermined signal by way of a communication network such as the Internet.

The state determination section 110 is a section that determinations whether new discrimination criterion information for a desired denomination is stored in the discrimination criterion information storing subsection 203*a* of the storing section 203 or not and that sends a signal responsive to a determination result (which may be termed "a determination result signal" later) to the operation mode control section 120. As described above, three pieces of discrimination criterion signals designated for each denomination is stored in the storing subsection 203*a* in advance. Concretely speaking, three pieces of discrimination criterion information are currently set and stored for each of the 6 denominations of 1 Yen, 5 Yen, 10 Yen, 50 Yen, 100 Yen, and 500 Yen. This means that 18 pieces of current discrimination criterion information are stored in the storing subsection 203*a* in total. Since new pieces of discrimination criterion information to be added are configured to be stored in different memory areas from those in which the 18 pieces of current discrimination criterion information are stored, whether or not (all of) desired new pieces of discrimination criterion information are stored in the storing subsection 203*a* is found by sequentially searching the memory areas (memory addresses) prepared for the new pieces of discrimination criterion information. If the existence or non-existence of the desired new pieces of discrimination criterion information is found, the state determination section 110 sends the determination result signal indicating the meaning "pieces of new discrimination criterion information are stored for all the target denominations" or "pieces of new discrimination criterion information are not stored for at least one of the target denominations" to the operation mode control section 120.

The operation mode control section 120 is a section that outputs a mode selection signal in response to the content of the determination result signal outputted from the state determination section 110, thereby selectively activating any one of the normal mode execution section 130, the learning mode execution section 140, and the teaching mode execution section 150. If the content of the determination result signal is the meaning that "pieces of new discrimination criterion information are stored for all the target denominations", learning for generating a new piece of discrimination criterion information is unnecessary. As a result, the section 120 outputs the mode selection signal instructing "activation of the normal mode execution section" and therefore, the normal mode execution section 130 is activated. Subsequently, a series of prescribed operations of the normal mode are executed by the section 130. On the other hand, if the content of the determination result signal is the meaning that "pieces of new discrimination criterion information are not stored for at least one of the target denominations", learning for generating a new piece of discrimination criterion information is necessary. Accordingly, the section 120 outputs the mode selection signal instructing "activation of the learning mode execution section" and therefore, the learning mode execution section 140 is activated. Subsequently, a series of prescribed operations of the learning mode are executed by the section 140.

For example, if additional setting of new discrimination criterion information is necessary for the two denominations of 100 Yen and 500 Yen, it is found that new discrimination criterion information for the denominations of 100 Yen and 500 Yen is not stored yet by searching the memory areas (memory addresses) of the discrimination criterion information storing subsection 203*a* prepared for the new discrimination criterion information. In this case, the content of the determination result signal is that new discrimination criterion information is not stored for at least one of the target denominations" and therefore, the operation mode control section 120 activates the learning mode execution section 140. Subsequently, the series of prescribed operations of the learning mode are executed by the section 140.

In this embodiment, since the authenticity discrimination operation and the denomination discrimination operation like those in the normal mode are executed even if the learning mode is being executed. This means that the coin depositing/dispensing operation can be continuously executed in the coin depositing/dispensing machine 300 even in the leaning mode, which results in convenience for the users. If the pieces of new discrimination criterion information for the denominations of 100 Yen and 500 Yen are set and stored in the discrimination criterion storing subsection 203*a* due to execution of the leaning mode, the content of the determination result signal is turned to the one that "new discrimination criterion information is stored for all of the target denominations" and therefore, the learning mode execution section 140 is inactivated and the normal mode execution section 130 is activated instead by the operation mode control section 120. Subsequently, the series of prescribed operations of the normal mode are executed by the normal mode execution section 130, in which the authenticity discrimination of the two denominations of 100 Yen and 500 Yen is carried out using the pieces of new discrimination criterion information in addition to the pieces of current or existing discrimination criterion information.

As shown in FIG. 2, the operation mode control section 120 is configured to receive an external switching signal sent from the outside of the coin discrimination system 100 in addition to the determination result signal outputted from the state determination section 110. The external switching signal is used in the case where the service engineer in charge wants to manually execute the teaching mode. If the operation mode control section 120 receives the external switching signal, the section 120 outputs the mode selection signal instructing "activation of the teaching mode". In response to this, the teaching mode execution section 150 is activated. Subsequently, a series of prescribed operations of the teaching mode are executed by the teaching mode execution section 150.

Figure 15:
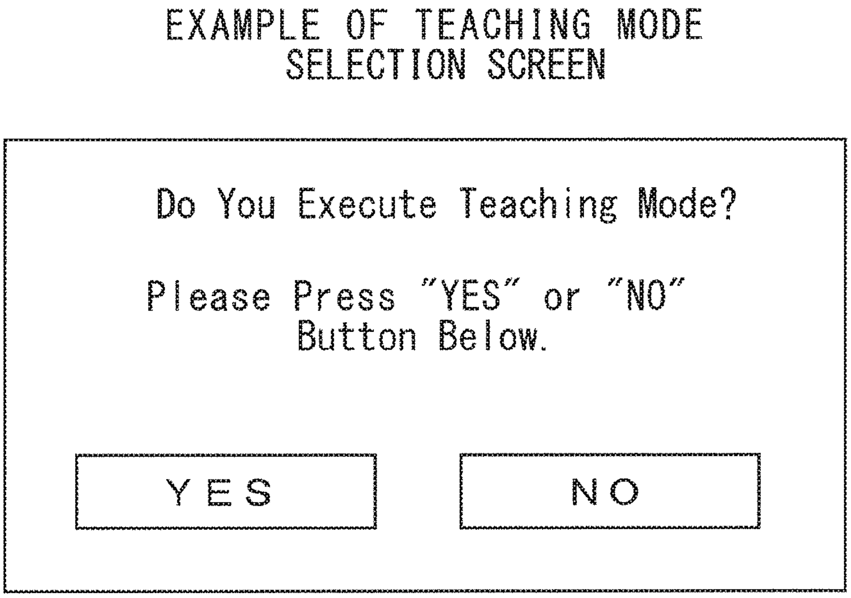
FIG. 15 is an explanatory diagram showing an example of a “teaching mode selection screen” used in the coin discrimination apparatus of FIG. 1.

The content of the teaching mode is approximately the same as that of the leaning mode; however, in the teaching mode, the inquiry message that "do you execute the teaching mode?" is displayed on the screen of the state display section 204, as shown in FIG. 15. FIG. 15 shows an example of the teaching mode selection screen displayed by the section 204. The teaching mode is executed only when the execution of the teaching mode is selected by the service engineer on the same screen, which is the difference from the learning mode.

The normal mode execution section 130 is a section that executes the normal mode, i.e., the normal coin discrimination operation of the coin discrimination apparatus 200. Concretely speaking, the section 130 executes a series of operations for discriminating the authentication and denomination of respective coins 30 that are successively conveyed based on the three pieces of coin sensor information sent from the coin sensor section 202.

Figure 3:
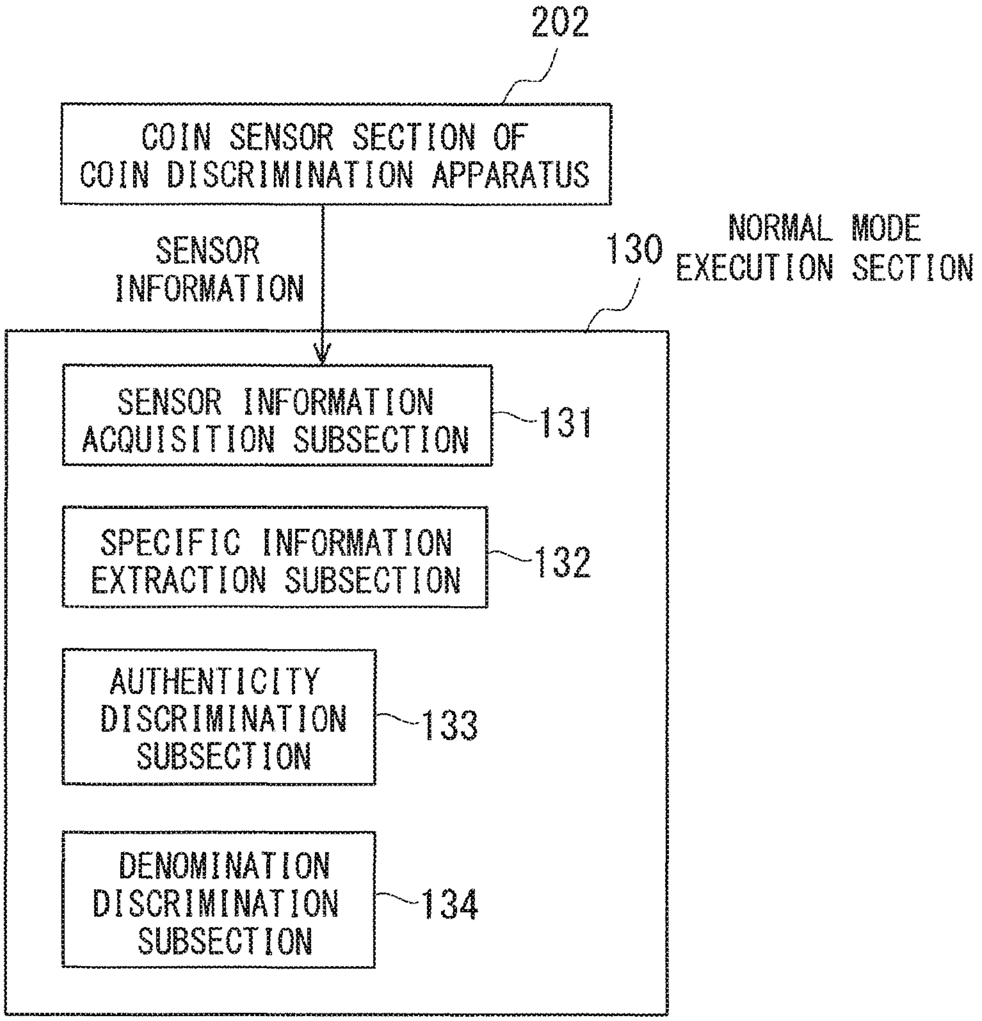
FIG. 3 is a functional block diagram showing the structure of a normal mode execution section in the coin discrimination system of FIG. 2.

The normal mode execution section 130 has a structure as shown in FIG. 3 and comprises a sensor information acquisition subsection 131, a specific information extraction subsection 132, an authenticity discrimination subsection 133, and a denomination discrimination subsection 134.

The sensor information acquisition subsection 131 is a subsection that acquires the first, second, and third sensor information (all of which is analog information) outputted respectively from the first, second, and third coin sensors 20*a*, 20*b*, and 20*c* provided in the coin sensor section 202, and stores these three sensor information in the sensor information storing subsection 203*b* of the storing section 203.

The specific information extraction subsection 132 is a subsection that reads the first, second, and third sensor information that has been acquired by the sensor information acquisition section 131 and stored in the sensor information storing subsection 203*b* to extract the first, second, and third specific information used for authenticity and denomination discriminations of each coin 30 from the first to third sensor information, and that stores these three specific information in the specific information storing subsection 203*c* of the storing section 203. For example, the subsection 132 extracts the minimum values of the first, second, and third sensor information whose values fluctuate with time and designates the aforementioned minimum values of the first, second, and third sensor information as the first, second, and third specific information.

The authenticity discrimination subsection 133 is a subsection that discriminates the authenticity of each coin 30 by reading the first, second, and third specific information that has been stored in the specific information storing subsection 203*c* and the discrimination criterion information for the respective denominations that has been stored in the discrimination criterion information storing subsection 203*a* and comparing these three specific information with these three discrimination criterion information corresponding thereto. The subsection 133 generates an authenticity signal indicating that a coin 30 as a current target is "an authentic one" or "a counterfeit one" and sends the authenticity signal thus generated to the coin distributing section 302. In addition, the first to third specific information that has read from the specific information storing subsection 203*c* by the subsection 133 is stored in the subsection 203*c*.

The denomination discrimination subsection 134 is a subsection that discriminates the denomination of each coin 30 by reading the first, second, and third specific information that has been stored in the specific information storing subsection 203*c* and the discrimination criterion information for the respective denominations that has been stored in the discrimination criterion information storing subsection 203*a* and comparing these three specific information with these three discrimination criterion information corresponding thereto. The subsection 134 generates a denomination signal indicating the denomination of a coin 30 as a current target and sends the denomination signal thus generated to the coin distributing section 302.

Since the operations of the authenticity discrimination subsection 133 and the denomination discrimination subsection 134 are common in the part where the first to third specific information is compared with the discrimination criterion information for the respective denominations, both of the authenticity discrimination and the denomination discrimination may be carried out through this information comparing part or process. In other words, if a target coin 30 corresponds to any one of the prescribed denominations, it is judged that the target coin 30 is an authentic one of the corresponding denomination; if a target coin 30 does not correspond to any one of the prescribed denominations, it is judged that the target coin 30 is a counterfeit one. In this case, since the common judgement part carries out both of the operations of the authenticity discrimination subsection 133 and the denomination discrimination subsection 134, the part can be termed the "authentication and denomination discrimination subsection".

The learning mode execution section 140 is a section that executes the learning mode. Specifically, the section 140 newly sets (i.e., generates and stores) new discrimination criterion information for each of the target denominations to add the new discrimination criterion information thus set to the current or existing discrimination criterion information while executing the normal coin discrimination operation (i.e., the aforementioned authenticity and denomination discrimination operations by the normal mode execution section 130) of the coin discrimination apparatus 200. Concretely speaking, the section 140 additionally sets new discrimination criterion information for each target denomination while discriminating the authentication and denomination of respective coins 30 that are successively conveyed based on the three pieces of sensor information sent from the coin sensor section 202.

In the learning mode, the target denomination(s) is/are determined in advance. Specifically, a denomination that requires to update the existing or current authenticity discrimination process is designated by additionally setting new discrimination criterion information in addition to the existing or current discrimination criterion information. For example, in the case where coin discrimination is carried out for the 6 denominations of 1 Yen, 5 Yen, 10 Yen, 50 Yen, 100 Yen, and 500 Yen of Japanese Yen, all the 6 denominations rarely necessitate addition of new discrimination criterion information; but it is usual that necessity of new discrimination criterion information is limited to a part of these 6 denominations. For this reason, in the leaning mode, for example, by designating a denomination or denominations to which new discrimination criterion information needs to be added as a target, new discrimination criterion information is additionally set about the denomination(s) designated as the target only.

Figure 4:
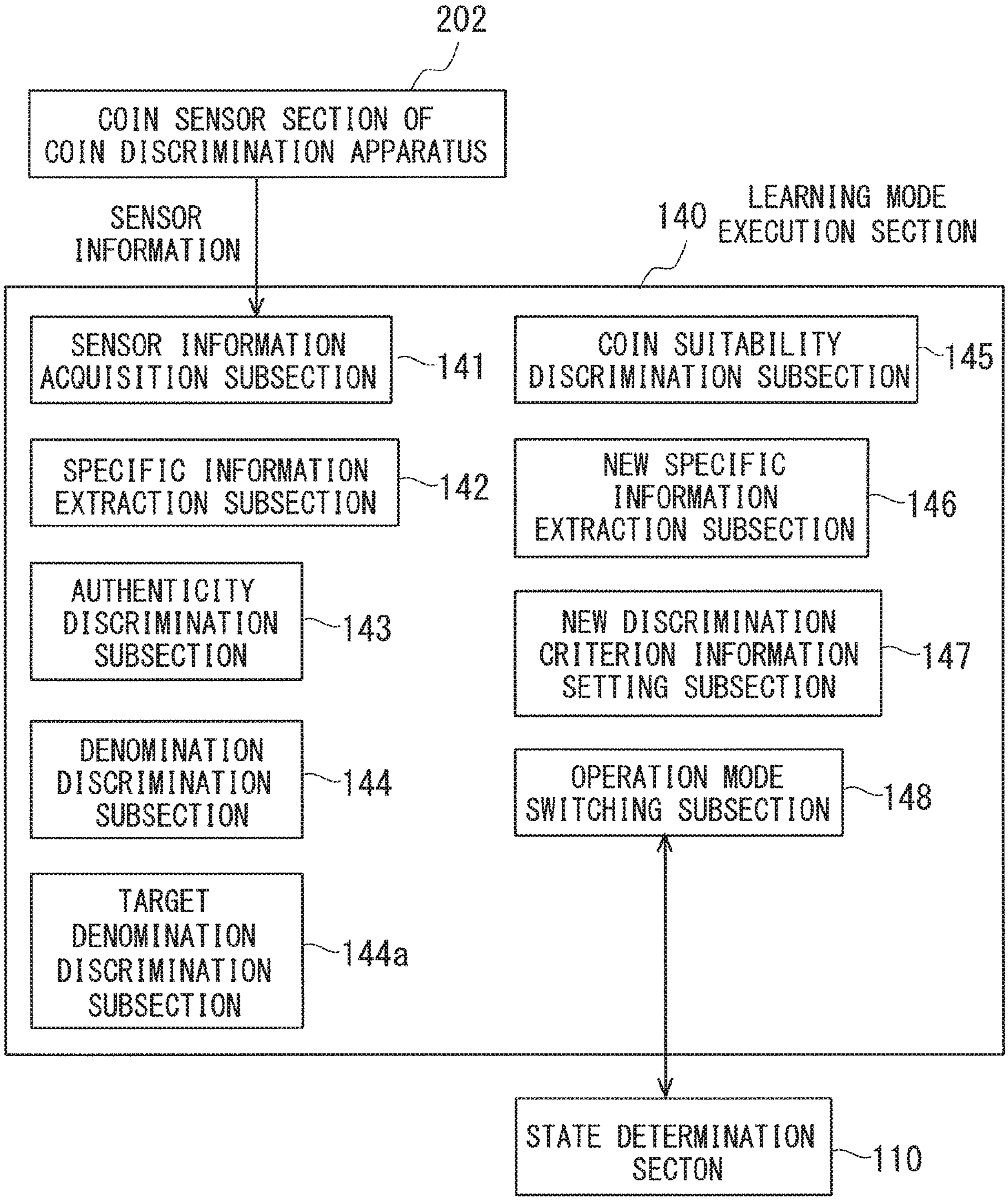
FIG. 4 is a functional block diagram showing the structure of a learning mode execution section in the coin discrimination system of FIG. 2.

The learning mode execution section 140 has a structure as shown in FIG. 4 and comprises a sensor information acquisition subsection 141, an specific information extraction subsection 142, an authenticity discrimination subsection 143, a denomination discrimination subsection 144, a target denomination discrimination subsection 144*a*, a coin suitability discrimination subsection 145, a new specific information extraction subsection 146, a new discrimination criterion information setting subsection 147, and an operation mode switching section 148.

The sensor information acquisition subsection 141 is a subsection that acquires the first, second, and third sensor information (all of which is analog information) outputted respectively from the first, second, and third coin sensors 20*a*, 20*b*, and 20*c* provided in the coin sensor section 202 and stores these three sensor information in the sensor information storing subsection 203*b* of the storing section 203. The aforementioned function of the subsection 141 is the same as that of the sensor information acquisition subsection 131 of the normal mode execution section 130.

The specific information extraction subsection 142 is a subsection that reads the first, second, and third sensor information that has been acquired and stored in the sensor information storing subsection 203*b* by the sensor information acquisition section 141 to extract the first, second, and third specific information which is used for authenticity and denomination discriminations of each coin 30 from the first to third sensor information, and that stores these three specific information in the specific information storing subsection 203*c* of the storing section 203. For example, the subsection 142 extracts the minimum values of the first, second, and third sensor information whose values fluctuate with time and designates the aforementioned minimum values of the first, second, and third sensor information as the first, second, and third specific information. The aforementioned function of the subsection 142 is the same as that of the specific information extraction subsection 132 of the normal mode execution section 130.

The authenticity discrimination subsection 143 is a subsection that discriminates the authenticity of each coin 30 by reading the first, second, and third specific information that has been stored in the specific information storing subsection 203*c* and the discrimination criterion information for the respective denominations that has been stored in the discrimination criterion information storing subsection 203*a* and comparing these three specific information with these three discrimination criterion information corresponding thereto. The subsection 143 generates an authenticity signal indicating that a coin 30 as a current target is "an authentic one" or "a counterfeit one" and sends the authenticity signal thus generated to the coin distributing section 302. In addition, the first to third specific information that has been read from the specific information storing subsection 203*c* by the subsection 133 is stored in the subsection 203*c*. The aforementioned function of the subsection 143 is the same as that of the authenticity discrimination subsection 133 of the normal mode execution section 130.

The denomination discrimination subsection 144 is a subsection that discriminates the denomination of each coin 30 by reading the first, second, and third specific information that has been stored in the specific information storing subsection 203*c* and the discrimination criterion information for the respective denominations that has been stored in the discrimination criterion information storing subsection 203*a* and comparing these three specific information with these three discrimination criterion information corresponding thereto. The subsection 144 generates a denomination signal indicating the denomination of a coin 30 as a current target and sends the denomination signal thus generated to the coin distributing section 302. The aforementioned function of the subsection 144 is the same as that of the denomination discrimination subsection 134 of the normal mode execution section 130.

Since the operations of the authenticity discrimination subsection 143 and the denomination discrimination subsection 144 are common in the part where the first to third specific information is compared with the discrimination criterion information for the respective denominations, both of the authenticity discrimination and the denomination discrimination may be carried out through this information comparing part or process. In other words, if a target coin 30 corresponds to any one of the prescribed denominations, it is judged that the target coin 30 is an authentic one of the corresponding denomination; if a target coin 30 does not correspond to any one of the prescribed denominations, it is judged that the target coin 30 is a counterfeit one. In this case, since the common judgement part carries out both of the operations of the authenticity discrimination subsection 143 and the denomination discrimination subsection 144, the part can be termed the "authentication and denomination discrimination subsection". This is the same as that of the normal mode execution section 130.

The target denomination discrimination subsection 144*a* is a subsection that discriminate whether the denomination of each coin 30 corresponds to any one of the target denominations by comparing the denomination information about each coin 30 obtained as the discrimination result by the authenticity discrimination subsection 143 and the denomination discrimination subsection 144 with the prescribed target denomination information. Here, the prescribed target denomination information is written (designated) in this subsection 144*a* in advance; however, the prescribed target denomination information may be stored in any other memory device or memory area than the subsection 144*a* and may be read out from the said device or areas according to the necessity.

The coin suitability discrimination subsection 145 is a subsection that discriminates whether or not a coin 30 that has been judged authentic during execution of the learning mode has a suitability (i.e., coin suitability) for additional setting of new discrimination criterion information, in other words, whether or not the coin 30 has an appropriate size and an appropriate physical properties that can be used for additional setting of new discrimination criterion information. The subsection 145 sends a suitability discrimination result signal indicating the suitability discrimination result to the new specific information extraction subsection 146 according to whether or not the coin 30 as the target has the coin suitability.

The new specific information extraction subsection 146 is a subsection that reads the first, second, and third sensor information that has been acquired and stored in the sensor information storing subsection 203*b* by the sensor information acquisition section 141 in response to the suitability discrimination result signal sent from the coin suitability discrimination subsection 145 to extract new specific information (which corresponds to fourth specific information) used for the authenticity discrimination and the denomination discrimination of each coin 30 based on the first to third sensor information, and that stores the new specific information in the specific information storing subsection 203*c* of the storing section 203. If the suitability discrimination result signal sent from the coin suitability discrimination subsection 145 indicates that the current coin 30 has the coin suitability, the new specific information extraction subsection 146 extracts new specific information and stores temporarily the information thus extracted in the specific information storing subsection 203*c*. If the suitability discrimination result signal indicates that the current coin 30 does not have the coin suitability, the subsection 146 does not execute the extraction and storing of new specific information. For example, if the time at which the first and second sensor information fluctuating with time is equal in value to each other is detected, the value at the detected time may be used as the new specific information (i.e., the fourth specific information).

The new discrimination criterion information setting subsection 147 is a subsection that generates or sets new discrimination criterion information based on the new specific information that has been extracted and stored by the new specific information extraction subsection 146 and that stores the new discrimination criterion information thus generated in the discrimination criterion information storing subsection 203*a*. For example, if the new specific information, which is extracted and stored for each coin 30 of one of the target denominations by the new specific information extraction subsection 146, is collected for a prescribed (total) number of the coins 30 of the target denomination concerned, new discrimination criterion information for the target denomination in question can be obtained and stored in the storing subsection 203*a* based on the average of the pieces of new specific information for the prescribed (total) number of the coins 30.

The operation mode switching subsection 148 is a subsection provided for switching among the operation modes according to the necessity. Specifically, when additional setting of the new discrimination criterion information for one target denomination is completed in the learning mode, the operation mode switching subsection 148 instructs the state determination section 110 to search the discrimination criterion information storing subsection 203*a* of the storing section 203. As a result, if new discrimination criterion information with respect to at least one of the predetermined target denominations is not stored in the predetermined memory area for the new discrimination criterion information in the subsection 203*a*, the operation mode switching subsection 148 instructs the state determination section 110 to continue the execution of the learning mode. On the other hand, if new discrimination criterion information with respect to all of the predetermined target denominations is stored in the predetermined memory area for the new discrimination criterion information in the subsection 203*a*, in other words, the predetermined target denominations for which new discrimination criterion information is not stored is not found, the operation mode switching subsection 148 instructs the state determination section 110 to terminate the execution of the learning mode and start the execution of the normal mode.

The teaching mode execution section 150 is a section that executes the teaching mode. Specifically, the section 150 newly sets (i.e., generates and stores) new discrimination criterion information for each of the target denominations to add the new discrimination criterion information to the existing or current discrimination criterion information without executing the normal coin discrimination operation (i.e., the aforementioned authenticity and denomination discrimination operations by the normal mode execution section 130) of the coin discrimination apparatus 200. Concretely speaking, the section 150 additionally sets new discrimination criterion information for each target denomination while discriminating the authentication and denomination of respective coins 30 that are successively conveyed based on the three pieces of sensor information sent from the coin sensor section 202. The section 150 is configured to be activated only when an instruction to execute the teaching mode is received from the service engineer.

Figure 5:
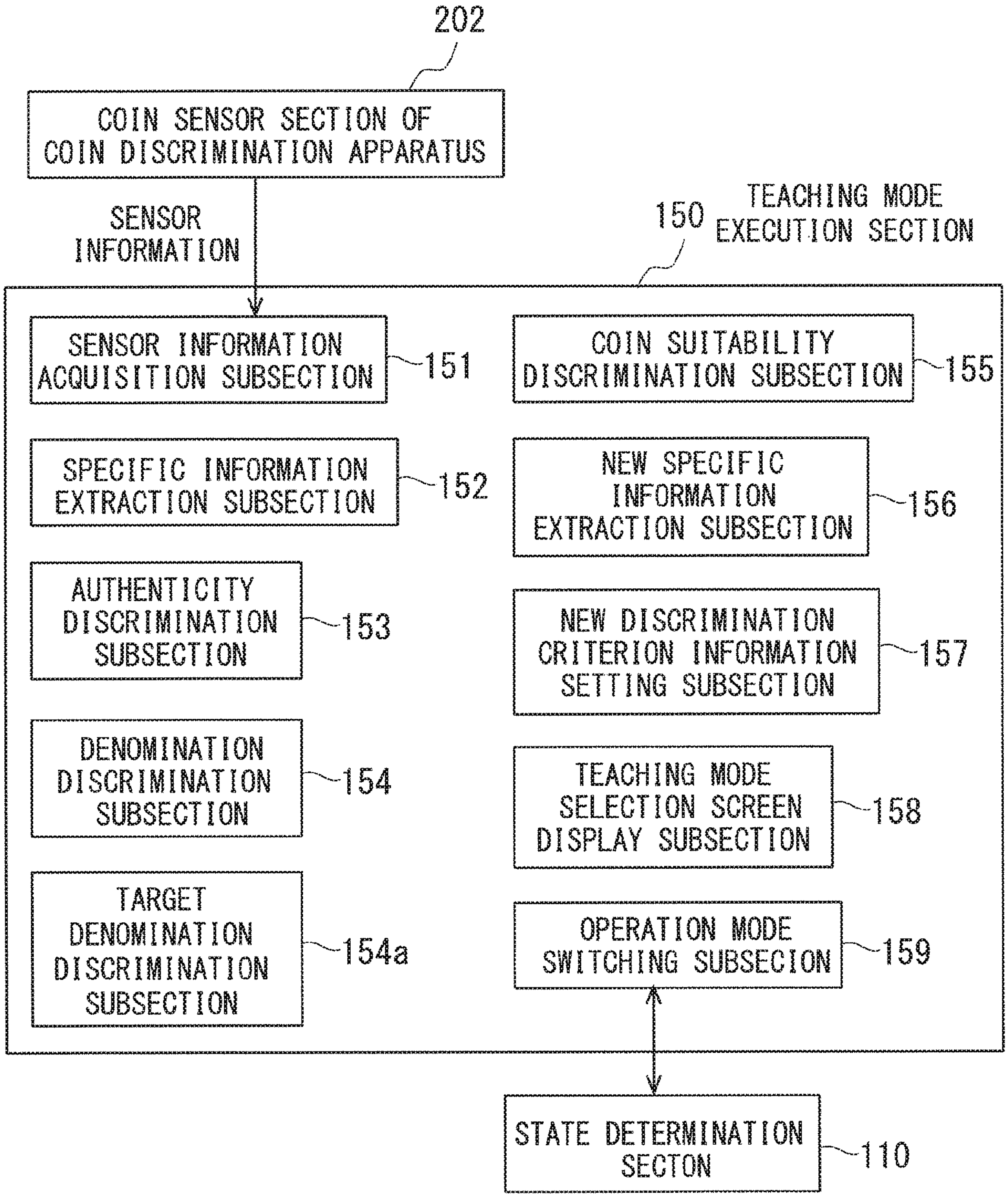
FIG. 5 is a functional block diagram showing the structure of a teaching mode execution section in the coin discrimination system of FIG. 2.

The teaching mode execution section 150 has a structure as shown in FIG. 5 and comprises a sensor information acquisition subsection 151, a specific information extraction subsection 152, an authenticity discrimination subsection 153, a denomination discrimination subsection 154, a target denomination discrimination subsection 154*a*, a coin suitability discrimination subsection 155, a new specific information extraction subsection 156, a new discrimination criterion information setting subsection 157, a teaching mode selection screen display subsection 158, and an operation mode switching subsection 159.

The sensor information acquisition subsection 151, the specific information extraction subsection 152, the authenticity discrimination subsection 153, the denomination discrimination subsection 154, the target denomination discrimination subsection 154*a*, the coin suitability discrimination subsection 155, the new specific information extraction 156, and the new discrimination criterion information setting subsection 157 have the same functions as those of the sensor information acquisition subsection 141, the specific information extraction subsection 142, the authenticity discrimination subsection 143, the denomination discrimination subsection 144, the target denomination discrimination subsection 144*a*, the coin suitability discrimination subsection 145, the new specific information extraction 146, and the new discrimination criterion information setting subsection 147, respectively. Accordingly, explanations about these subsections of the teaching mode execution section 150 will be omitted here.

The teaching mode selection screen display subsection 158 is a subsection that displays a predetermined teaching mode selection screen (an example of which is shown in FIG. 15) on the screen of the state display section 204 of the coin discrimination apparatus 200 or on the personal computer which is connected to the apparatus 200 by the service engineer, and that conducts an inquiry about whether or not to select the teaching mode to the engineer. If to select the teaching mode is instructed by the engineer on the teaching mode selection screen, the teaching mode execution section 150 is activated, thereby executing the series of the operations of the teaching mode. If not to select the teaching mode is instructed by the engineer on the same screen, the teaching mode execution section 150 is not activated and the execution of the normal mode is started instead.

The operation mode switching subsection 159 is a subsection provided for switching among the operation modes according to the necessity. Specifically, when additional setting of the new discrimination criterion information for one target denomination is completed in the teaching mode, the operation mode switching subsection 159 instructs the state determination section 110 to search the discrimination criterion information storing subsection 203*a* of the storing section 203. As a result, if new discrimination criterion information with respect to at least one of the predetermined target denominations is not stored in the predetermined memory area of the subsection 203*a*, the operation mode switching subsection 159 instructs the state determination section 110 to continue the execution of the teaching mode. On the other hand, if new discrimination criterion information with respect to all of the predetermined target denominations is stored in the predetermined memory areas of the subsection 203*a*, in other words, the predetermined target denominations for which new discrimination criterion information is not stored is not found, the operation mode switching subsection 159 instructs the state determination section 110 to terminate the execution of the teaching mode and start the execution of the normal mode.

Operation of Coin Discrimination Apparatus

Next, the operation of the coin discrimination apparatus 200 having the aforementioned structure and functions will be explained below with reference to the flowcharts shown in FIGS. 6 to 8.

Here, it is supposed that the denominations of coins 30 to be discriminated in the apparatus 200 are 6 denominations of Japanese Yen, i.e., 1 Yen, 5 Yen, 10 Yen, 50 Yen, 100 Yen, and 500 Yen. Moreover, it is supposed that the denominations to which new discrimination criterion information should be additionally set, i.e., the target denominations, are two denominations of 100 Yen and 500 Yen.

As explained above, all of the first, second, and third coin sensors 20*a*, 20*b*, and 20*c* are magnetic sensors and arranged at predetermined intervals along the linear coin conveying path 10, as shown in FIG. 11. For this reason, if a coin 30, which is conveyed along the path 10, passes in this order through the vicinities of the coin sensors 20*a*, 20*b*, and 20*c*, the first, second, and third sensor information as the output signals that are respectively sent from the first, second, and third sensors 20*a*, 20*b*, and 20*c* fluctuate temporarily, in which the fluctuations of the first, second, and third sensor information occur at different times. Accordingly, for example, the first to third sensor information is expressed as the waveform signals Wa, Wb, and Wc shown in FIG. 12. The time at which the fluctuation of the amplitude (voltage value) of the waveform Wa as the first sensor information is the earliest. The time at which the fluctuation of the amplitude (voltage value) of the waveform Wc as the third sensor information is the latest. The time at which the fluctuation of the amplitude (voltage value) of the waveform Wb as the second sensor information is between the fluctuation time of the first waveform signal Wa and that of the third waveform signal Wc.

In this way, each of the first to third sensor information is analog information having a continuous value, and the fluctuation times of these three sensor information are shifted each other. The coin discrimination apparatus 200 performs the coin discrimination (i.e., authenticity discrimination and denomination discrimination) of respective coins 30 based on the preset discrimination criterions using the first to third sensor information. Moreover, the apparatus 200 performs the additional setting of a new discrimination criterion used for the aforementioned authenticity discrimination and denomination discrimination with respect to the predetermined target denominations. Hereinafter, the aforementioned three operation modes of the coin discrimination operation of the apparatus 200 will be explained separately.

Normal Mode

The normal mode will be explained first. The normal mode is executed during daily operation of the coin depositing/dispensing machine 300 and realized by the normal mode execution section 130 shown in FIG. 3. The operation flow of this mode is shown in FIG. 7.

In the normal mode, first, the sensor information acquisition subsection 131 judges whether or not the first, second, and third sensor information which are respectively outputted from the first, second, and third coin sensors 20*a*, 20*b*, and 20*c* due to detection of one coin 30 is acquired (Step S21). If it is judged that the first, second, and third sensor information is acquired, the subsection 131 temporarily stores the first to third sensor information thus acquired in the sensor information storing subsection 203*b* of the storing section 203 and then, the flow is moved to the Step S22. If it is judged that the first, second, and third sensor information is not acquired, the flow is returned to the position immediately before the step S21 and the subsection 131 conducts the same judgment as stated above again after a predetermined time has passed. Incidentally, the subsection 131 is configured to automatically acquire the first to third sensor information upon their arrival at the subsection 131 and the judgement in the Step S21 is carried out whenever a predetermined time passes. Accordingly, it may be said that the step S21 is a step of always awaiting the arrival of the first to third sensor information.

In the step S22, the specific information extraction subsection 132 reads the first to third sensor information stored in the sensor information storing subsection 203*b* a little while ago and extracts respectively the first, second, and third specific information from the first, second, and third sensor information by a predetermined extraction method. Here, the "specific information" is information which is used for coin discrimination (i.e., authenticity and denomination discriminations of each coin 30). For example, if the predetermined extraction method is a method of "extracting the minimum value of each of the first to third sensor information", the minimum values of the voltage values of the first, second, and third sensor information that fluctuate with time are extracted and the minimum values thus extracted are respectively defined as the first, second, and third specific information. In this case, the minimum values of the amplitude (voltage) of the waveform signals Wa, Wb, and Wc as the first, second, and third sensor information are respectively given by the points A, B, and C in FIG. 12. In this way, the first to third specific information which is extracted by the specific information extraction subsection 132 is stored in the specific information storing section 203*c* of the storing section 203.

In the step S23, the authenticity discrimination subsection 133 reads the first to third specific information stored in the specific information storing subsection 203*c* and the first to third discrimination criterion information previously stored in the discrimination criterion information storing subsection 203*a*, and compares respectively the first to third specific information with the first to third discrimination criterion information to judge whether the coin 30 as the current target (which means the most recent coin 30 that has been detected by the first, second, and third coin sensors 20*a*, 20*b*, and 20*c*) is an authentic or counterfeit coin (authenticity discrimination). For example, if each of the first to third specific information of the current target coin 30 is within the lower and upper limits of the range (which includes the lower and upper limit values) which is set for each of the 6 denominations of Japanese Yen, the target coin 30 is judged authentic. If any one of the first to third specific information of the current target coin 30 is not within the lower and upper limits of the range (which includes the lower and upper limit values), this coin 30 is judged counterfeit. If the target coin 30 is judged counterfeit in this authenticity discrimination (in the judgement of the step S23), this coin 30 is discharged to the outside (e.g., the dispensing tray) of the coin depositing/dispensing machine 300 by way of a predetermined coin discharge process (step S27). Thereafter, the flow is returned to the position immediately before the step S21 and the subsection 133 conducts the same process of the step S21 to the step S23 with respect to a next target coin 30. If the next target coin 30 is judged authentic, the flow is advanced to the step S24.

In the step S24, the denomination discrimination subsection 134 compares the first to third specific information which is read from the specific information storing subsection 203*c* with the first to third discrimination criterion information which is previously read from the discrimination criterion information storing subsection 203*a* to judge which one of the target denominations corresponds to the denomination of the current target coin 30 (denomination discrimination). For example, if each of the first to third specific information of the current target coin 20 is within the lower and upper limits of the discrimination range (which includes the lower and upper limit values) relating to a designated one of the 6 denominations of Japanese Yen, it is judged that the denomination of the target coin 20 corresponds to the designated one. After the denomination discrimination is completed in this way, the flow is advanced to the step S25.

The target coin 30 in the step S24 has been already judged authentic by the authenticity discrimination process in the step S23. Thus, for example, as explained in the above description about the step S23, it is found that each of the first to third specific information of the current target coin 20 is within the discrimination range relating to the designated denomination of Japanese Yen. Accordingly, the denomination of the target coin 30 can be quickly known from the development process of the authenticity discrimination in the step S23. For this reason, it is unnecessary to compare the first to third specific information read from the specific information storing subsection 203*c* with the first to third discrimination criterion information previously read from the discrimination criterion information storing subsection 203*a*, which results in efficiency. In this way, the authenticity discrimination in the step S23 and the denomination discrimination in the step S24 may be carried out collectively.

Each of the first to third discrimination criterion information which is preset for the respective denominations is not one value but has a permissible range. Concretely speaking, for example, if the first, second, and third discrimination criterion information for the denomination of 500 Yen is given as S1(500), S2(500), and S3(500), respectively, the permissible ranges of the first, second, and third discrimination criterion information S1(500), S2(500), and S3(500) are given by the following inequalities:

$p1(500) \leq S1(500) \leq q1(500)$ $p2(500) \leq S2(500) \leq q2(500)$ $p3(500) \leq S3(500) \leq q3(500)$ Similarly, if the first, second, and third discrimination criterion information for the denomination of 100 Yen is given as S1(100), S2(100), and S3(100), respectively, the permissible ranges of the first, second, and third discrimination criterion information S1(100), S2(100), and S3(100) are given by the following inequalities:

$p1(100) \leq S1(100) \leq q1(100)$ $p2(100) \leq S2(100) \leq q2(100)$ $p3(100) \leq S3(100) \leq q3(100)$ In the same way, regarding the denomination of 50 Yen, the permissible ranges of the first, second, and third discrimination criterion information S1(50), S2(50), and S3(50) are given by the following inequalities:

$p1(50) \leq S1(50) \leq q1(50)$ $p2(50) \leq S2(50) \leq q2(50)$ $p3(50) \leq S3(50) \leq q3(50)$ Regarding the denomination of 10 Yen, the permissible ranges of the first, second, and third discrimination criterion information S1(10), S2(10), and S3(10) are given by the following inequalities:

$p1(10) \leq S1(10) \leq q1(10)$ $p2(10) \leq S2(10) \leq q2(10)$ $p3(10) \leq S3(10) \leq q3(10)$ Regarding the denomination of 5 Yen, the permissible ranges of the first, second, and third discrimination criterion information S1(5), S2(5), and S3(5) are given by the following inequalities:

$p1(5) \leq S1(5) \leq q1(5)$ $p2(5) \leq S2(5) \leq q2(5)$ $p3(5) \leq S3(5) \leq q3(5)$ Regarding the denomination of 1 Yen, the permissible ranges of the first, second, and third discrimination criterion information S1(1), S2(1), and S3(1) are given by the following inequalities:

$p1(1) \leq S1(1) \leq q1(1)$ $p2(1) \leq S2(1) \leq q2(1)$ $p3(1) \leq S3(1) \leq q3(1)$ In this case, if any one of the first to third specific information of the target coin 20 is not within the lower and upper limits of the aforementioned permissible range (which includes the lower and upper limit values) for each of the 6 denominations of Japanese Yen, this coin 20 is judged counterfeit. On the contrary, if all of the first to third specific information of the target coin 20 is within the lower and upper limits of the aforementioned permissible ranges (which includes the lower and upper limit values) for one denomination of Japanese Yen, this coin 20 is judged authentic (step S23). Moreover, it is judged that the designated denomination (e.g., 500 Yen) selected from the 6 denominations of Japanese Yen corresponds to the denomination of the target coin 20 (step S24), where the aforementioned designated denomination has been judged that each of the first to third specific information for the denomination concerned (e.g., 500 Yen) is within the aforementioned permissible ranges (which includes the lower and upper limit values) during the authenticity discrimination process (step S23).

In the step S25, the authenticity discrimination subsection 133 outputs the authenticity signal corresponding to the authenticity discrimination result to the coin distributing section 302. Moreover, the denomination discrimination subsection 134 outputs the denomination signal corresponding to the denomination discrimination result to the coin distributing section 302. The coin distributing section 302 executes the distribution operation of coins 30 according to the contents of the authenticity and denomination signals thus received.

In the step S26, it is judged whether coins subsequent to the current coin 30 remain or not. If subsequent coins 30 remain, the flow is returned to the position immediately before the step S21 and the same process of the step S21 to the step S26 is repeated with respect to the remaining coins 30. If subsequent coins 30 do not remain, the coin discrimination process is terminated and awaits the arrival of the sensor information at the sensor information acquisition subsection 131. The judgment whether coins subsequent to the current coin 30 remain or not can be easily carried out by, for example, detecting the arrival of the first to third sensor information for the subsequent coins 30 by the sensor information acquisition subsection 131.

In the normal mode executed for daily operation of the coin depositing/dispensing machine 300, the aforementioned authenticity and denomination discrimination operations are carried out for respective target coins 30 that are successively thrown into the machine 300.

Learning Mode

Next, the learning mode will be explained. The learning mode is used for additionally setting new discrimination criterion information in the coin discrimination apparatus 200 by learning. The learning mode is realized by the learning mode execution section 140 shown in FIG. 4. The operation flow of this mode is shown in FIG. 6.

Here, as explained above about the normal mode, it is supposed that the two denominations of 100 Yen and 500 Yen selected from the 6 denominations of Japanese Yen are the target denominations to which new discrimination criterion information needs to be additionally set. However, the present invention is not limited to this; it is needless to say that the count of the target denominations may be unity or greater than three or more.

In the learning mode, learning for generating new discrimination criterion information for the predetermined target denominations (i.e., 500 Yen and 100 Yen) is performed, in which the learning is performed while performing the same operation as the normal mode. Specifically, market circulating coins which are provided from the users are used for learning and new specific information for the respective target denominations is generated from the first to third sensor information during the process for authenticity discrimination and denomination discrimination of the market circulating coins, thereby additionally setting the new specific information for the respective target denominations using the new specific information thus generated. The details of the learning mode are explained below.

First, the state determination section 110 determines whether or not new discrimination criterion information has been set for all of the predetermined target denominations of coins 30 and outputs a determination result signal corresponding to the determination result to the operation mode control section 120 (Step S1).

Here, the determination whether or not new discrimination criterion information has been set for all of the predetermined target denominations in the step S1 is performed by searching the predetermined memory areas (addresses) in the discrimination criterion information storing subsection 203*a* of the storing section 203. Specifically, discrimination criterion information for each of the six denominations (i.e., the current or existing discrimination criterion information) is already set at the time of shipment of the coin depositing/dispensing machine 300 and stored in their predetermined memory areas (addresses) in the discrimination criterion information storing subsection 203*a*. Moreover, it is configured that new discrimination criterion information that is set after the time of shipment of the machine 300 (after the start of the operation of the machine 300), which is separately from the existing discrimination criterion information. For this reason, whether or not some information (some value) is stored in each of the said memory areas is known easily. As a result, the determination whether or not new discrimination criterion information has been set for all of the predetermined target denominations can be realized by searching the whole memory areas for the new discrimination criterion information.

When it is determined that new discrimination criterion information has been set for all of the predetermined target denominations in the step S1, additional setting of new coin discrimination criterion information is unnecessary; therefore, the determination result signal of the state determination section 110 is an instruction to "execute the normal mode". In response to the said determination result signal, the operation mode control section 120 activates the normal mode execution section 130. In this way, the coin discrimination apparatus 200 causes the transition to the normal mode (step S15). Then, the normal mode execution section 130 executes the series of operations of the normal mode shown in FIG. 7 (step S16). After that, the apparatus 200 operates in accordance with the operation flow shown in FIG. 7.

When it is determined that new discrimination criterion information has not been set for all of the predetermined target denominations in the step S1, which means that new discrimination criterion information has not been set for at least one of the predetermined target denominations, the determination result signal outputted by the state determination section 110 is an instruction to "execute the leaning mode"; in response to this signal, the operation mode control section 120 activates the leaning mode execution section 140. In this way, the coin discrimination apparatus 200 causes the transition to the leaning mode (step S2). Thereafter, the flow advances to the step S3.

In the step S3, the sensor information acquisition subsection 141 judges whether or not the first, second, and third sensor information outputted respectively from the first, second, and third coin sensors 20*a*, 20, and 20*c* due to detection of one coin 30 has been acquired. If it is judged that the first to third sensor information has been acquired, the sensor information acquisition subsection 141 stores temporarily the first to third sensor information thus acquired in the sensor information storing subsection 203*b* and then, the flow advances to the step S4. If it is judged that the first to third sensor information has not been acquired, the subsection 141 returns the operation to the position just before the step S3 and then, performs the same judgement again after a predetermined time passes.

Incidentally, the sensor information acquisition subsection 141 is configured in such a way as to automatically acquire the first to third sensor information upon receipt of them and the subsection 141 performs the judgment of Step S3 every time the predetermined period passes; therefore, it may be said that the step S3 is the step of continuously waiting for arrival of the first to third sensor information. The operation in the step S3 is the same as that of the step S21 in the normal mode (see FIG. 7).

In the Step S4, the specific information extraction subsection 142 reads the first to third sensor information, which has been stored a little while ago, from the sensor information storing subsection 203*b* and then, extracts the first, second, and third specific information from the first to third sensor information by a predetermined extraction method. For example, if the predetermined extraction method is a method of "extracting the minimum value of each of the first to third sensor information", the minimum values of the voltage values of the first, second, and third sensor information that fluctuate with time are extracted and the minimum values thus extracted are respectively defined as the first, second, and third specific information. In this case, the minimum values of the amplitude (voltage) of the waveform signals Wa, Wb, and Wc as the first, second, and third sensor information are respectively given by the points A, B, and C in FIG. 12. The first to third specific information that is extracted by the specific information extraction subsection 142 in this way is temporarily stored in the specific information storing section 203*c* of the storing section 203. In addition, the operation in the step S4 is the same as that of the step S22 in the normal mode (see FIG. 7).

In the step S5, the authenticity discrimination subsection 143 reads the first to third specific information, which has been stored a little while ago, from the specific information storing subsection 203*c* and the first to third discrimination criterion information previously stored in the discrimination criterion information storing subsection 203*a*. Thereafter, the subsection 143 compares respectively the first to third specific information with the first to third discrimination criterion information, thereby judging whether the coin 30 as the current target (which means the most recent coin 30 that has been detected by the first, second, and third coin sensors 20*a*, 20*b*, and 20*c*) is an authentic or counterfeit coin (authenticity discrimination). For example, if each of the first to third specific information of the current target coin 20 is between the lower and upper limits of the ranges (which includes the lower and upper limit values) that is set for each of the 6 denominations of Japanese Yen, the target coin 20 is judged authentic. If any one of the first to third specific information of the current target coin 20 is not between the lower and upper limits of the ranges (which includes the lower and upper limit values), this coin 20 is judged counterfeit. If the target coin 20 is judged counterfeit in this authenticity discrimination (in the judgement of the step S5), this coin 30 is discharged to the outside (e.g., the dispensing tray) of the coin depositing/dispensing machine 300 by way of a predetermined coin discharge process (step S6). Thereafter, the operation flow is returned to the position immediately before the step S3 and the subsection 143 conducts the same process from the step S3 to the step S5 with respect to a next target coin 30. If the next target coin 30 is judged authentic, the flow advances to the step S7. In addition, the operations in the steps S5 and S6 are respectively the same as those of the steps S23 and S27 in the normal mode (see FIG. 7).

In the step S7, the denomination description subsection 144 compares the first to third specific information of the current target coin 30 read from the specific information storage subsection 203*c* with the first to third discrimination criterion information which is read from the discrimination criterion information storing subsection 203*a*, thereby judging which one of the target denominations corresponds to the denomination of the current target coin 30 (denomination discrimination). After the denomination discrimination is completed in this way, the operation flow advances to the step S8. In addition, the operations in the step S7 is the same as that of the step S24 in the normal mode (see FIG. 7).

The target coin 30 in the step S7 has been already judged authentic by the authenticity discrimination process in the step S5. Thus, for example, as explained in the above description about the step S5, it is found that each of the first to third specific information of the current target coin 20 is between the lower and upper limits of the corresponding discrimination range (which includes the lower and upper limit values) that has been set for a designated one of the 6 denomination of Japanese Yen. Accordingly, the denomination of the current target coin 20 can be quickly known from the progress of the authenticity discrimination process in the step S5. For this reason, it is unnecessary to respectively compare the first to third specific information read from the specific information storing subsection 203*c* with the first to third discrimination criterion information previously read from the discrimination criterion information storing subsection 203*a*, which results in efficiency. In this way, the authenticity discrimination in the step S5 and the denomination discrimination in the step S7 may be carried, out collectively.

In the step S8, the coin suitability discrimination subsection 145 judges whether or not the denomination of the current target coin 30 that has been found in the step S7 is one of the target denominations to which new discrimination criterion information should be additionally set. If the denomination of the coin 30 in question does not correspond to one of the target denominations, the operation flow jumps to the position immediately before the step S11 without conducting the steps S9 and S10, conducting the operations of the step S11 and its subsequent steps. This means that in the case where the denomination of the coin 30 as the discrimination target is not one of the target denominations, the coin suitability judgement in the step S9 and the specific information storing in the step S10 are not carried out. On the other hand, the denomination of the coin 30 in question corresponds to one of the target denominations, the operation flow advances to the next step S9 and the coin suitability of the coin 30 in question is judged.

If it is judged that the coin 30 in question has the denomination of 500 Yen or 100 Yen as the renewal target denominations, the operation flow advances to the next step S9, and the coin suitability of this coin 30 is judged.

Here, the "coin suitability" is a property or characteristic of a coin 30 as a discrimination target that shows whether or not the coin 30 is appropriate to generation of new discrimination criterion information. The "coin suitability" is judged by finding whether or not each of the first to third sensor information which is acquired from the coin 30 as the current target and which is stored in the sensor information storing subsection 203*b* is included in the permissible range of a corresponding one of the first, second, and third suitability criterion information.

For example, as explained in the case of the normal mode, it is supposed that the first, second, and third discrimination criterion information S1(500), S2(500), and S3(500) for the denomination of 500 Yen as one of the target denominations is given by the following inequalities:

$p1(500) \leq S1(500) \leq q1(500)$ $p2(500) \leq S2(500) \leq q2(500)$ $p3(500) \leq S3(500) \leq q3(500)$ Then, "new lower limits" p1n(500), p2n(500), and p3n (500) which are respectively larger than the lower limits p1(500), p2(500), and p3(500) and "new upper limits" q1n(500), q2n(500), and q3n(500) which are respectively smaller than the upper limits p1(500), p2(500), and p3(500) are newly set.

Accordingly, the first, second, and third suitability criterion information A1n(500), A2n(500), and A3n(500) for the denomination of 500 Yen are respectively set in the following inequalities:

$p1n(500) \leq A1n(500) \leq q1n(500)$ $p2n(500) \leq A2n(500) \leq q2n(500)$ $p3n(500) \leq A3n(500) \leq q3n(500)$ wherein $p1n(500) > p1(500)$, $p2n(500) > p2(500)$, $p3n(500) > p3(500)$, $q1n(500) < q1(500)$, $q2n(500) < q2(500)$, and $q3n(500) < q3(500)$.

Similarly, as explained in the case of the normal mode, it is supposed that the first, second, and third discrimination criterion information S1(100), S2(100), and S3(100) for the denomination of 100 Yen as another of the target denominations is given by the following inequalities:

$p1(100) \leq S1(100) \leq q1(100)$ $p2(100) \leq S2(100) \leq q2(100)$ $p3(100) \leq S3(100) \leq q3(100)$ Then, "new lower limits" p1n(100), p2n(100), and p3n (100) which are respectively larger than the lower limits p1(100), p2(100), and p3(100) and "new upper limits" q1n(100), q2n(100), and q3n(100) which are respectively smaller than the upper limits p1(100), p2(100), and p3(100) are newly set.

Accordingly, the first, second, and third suitability criterion information A1n(100), A2n(100), and A3n(100) for the denomination of 100 Yen are respectively set in the following inequalities:

$p1n(100) \leq A1n(100) \leq q1n(100)$ $p2n(100) \leq A2n(100) \leq q2n(100)$ $p3n(100) \leq A3n(100) \leq q3n(100)$ wherein $p1n(100) > p1(100)$, $p2n(100) > p(100)$, $p3n(100) > p3(100)$, $q1n(100) < q1(100)$, $q2n(100) < q2(100)$, and $q3n(100) < q3(100)$.

For example, it is preferred that the permissible ranges of the first, second, and third suitability criterion information A1n(500), A2n(500), and A3n(500) for the denomination of 500 Yen are respectively set in such a way as to have predetermined ratios to the permissible ranges of the first, second, and third discrimination criterion information S1(500), S2(500), and S3(500) for the denomination of 500 Yen. Similarly, for example, it is preferred that the permissible ranges of the first, second, and third suitability criterion information A1n(100), A2n(100), and A3n(100) for the denomination of 100 Yen are respectively set in such a way as to have predetermined ratios to the permissible ranges of the first, second, and third discrimination criterion information S1(100), S2(100), and S3(100) for the denomination of 100 Yen. Here, the predetermined ratios are, for example, 70% or 60%; however, it is needless to say that the predetermined ratios may be other values. The predetermined ratios may be adjusted in accordance with the necessary accuracy of the authentication discrimination.

The reason why the permissible ranges of the first, second, and third suitability criterion information A1n(500), A2n(500), and A3n(500) for the denomination of 500 Yen are respectively narrowed in such a way as to have predetermined ratios to the permissible ranges of the first, second, and third discrimination criterion information S1(500), S2(500), and S3(500) for the denomination of 500 Yen is that the circulating coins often worn down, damaged, and/or modified during circulation or use and as a result, the size and/or the physical properties of the circulating coins at the time of becoming discrimination targets for the coins discrimination apparatus 200 is/are usually deviated from those at the time of production. By selecting the coins having the size and physical properties close to those at the time of production as much as possible and using the coins thus selected in the coin suitability judgment in the step S9, the new specific information obtained from the selected coins 30 is close to that obtained from those at the time of production. Accordingly, there is an advantage that the new discrimination criterion information to be additionally set can be closer to the new discrimination criterion information that will be obtained through the leaning process using the dedicated coins prepared for leaning as much as possible.

In the step S9, if the denomination of the target coin 30 is 500 Yen or 100 Yen and the first to third sensor information of the same is within the permissible ranges of the first, second, and third suitability criterion information A1n(500), A2n(500), and A3n(500) for the denomination of 500 Yen or the permissible ranges of the first, second, and third suitability criterion information A1n(100), A2n(100), and A3n (100) for the denomination of 100 Yen, the target coin 30 in question is judged "suitable", i.e., this coin 30 has a coin suitability. Then, the operation flow advances to the step S10. In the step S10, new specific information for generating new discrimination criterion information is generated using the first to third specific information of the coin 30 in question which has been judged one of the target denominations (500 Yen or 100 Yen) in the step S7 and which has been judged suitable in the step S9, and the new specific information thus generated is temporarily stored in the memory area (address) for the new discrimination information in the specific information storing subsection 203*c*. Thereafter, the operation flow advances to the step S11. On the other hand, if the first to third sensor information of the target coin 30 having the denomination of 500 Yen or 100 Yen is not within the corresponding permissible ranges, the target coin 30 in question is judged "unsuitable", i.e., this coin 30 doesn't have a coin suitability. Then, the operation flow jumps to the position immediately before the step S11 without executing the step S10.

In the step S11, the authentication signal and the denomination signal each having the content corresponding to the authentication discrimination result in the step S5 and the denomination discrimination result in the step S7 are outputted toward the coin distributing section 302 of the coin depositing/dispensing machine 300. The distribution operation of the coin 30 is performed by the coin distributing section 302 in accordance with the contents of the authentication signal and the denomination signal received. Thereafter, the operation flow advances to the next step S12.

In the step S12, it is judged whether or not the total number of the coins 30 that have been subjected to the authentication discrimination in the step S5, the denomination discrimination in the step S7, and the coin suitability discrimination in the step S9 (i.e., the coins 30 having the denomination of 500 Yen or 100 Yen and positive coin suitability through the discrimination operations) reaches the prescribed number. This is to take an average of the new specific information of the prescribed number of the coins 30 (which is stored in the step S10) after discriminating the prescribed number of the coins 30 having the target denominations, thereby reducing the effect of fluctuation in value of the new specific information. This means that the value of the "prescribed number" may be set at a level that makes it possible to reduce the effect of such the fluctuation as above. The "prescribed number" may be set at, for example, 30; however, it is needless to say that the "prescribed number" may be set at any other value than 30.

If it is judged that the total number of the coins 30 does not reach the prescribed number in the step S12, the operation flow is returned to the position immediately before the step S3 and performs the processes of the step S3 to the step S11 again. If it is judged that the total number of the coins 30 reaches the prescribed number in the step S12, the operation flow is advanced to the next step S13.

In the step S13, the new specific information for the target denomination of 500 Yen or 100 Yen is calculated or generated by taking an average of the new specific information of the prescribed number of the coins 30 (which is stored in the step S10), and stored in the corresponding storage area of the discrimination criterion information storing subsection 203*a*. Thereafter, the operation flow is advanced to the next step S14.

In the step S14, it is judged whether or not the target denomination to which the new discrimination criterion information is set remain. Specifically, if the calculation (generation) and storing operations of the new discrimination criterion information for at least one of the target denominations of 500 Yen and 100 Yen are not yet completed through the steps S1 to S13, it is judged that the at least one of the target denominations to which new discrimination criterion information is set remains and then, the operation flow is jumped to the position immediately before the step S3 and the steps S1 to S13 are performed again. On the other hand, if the calculation (generation) and storing operations of the new discrimination criterion information for all of the target denominations of 500 Yen and 100 Yen is completed through the steps S1 to S13, it is judged that the target denominations to which new discrimination criterion information is set do not remain and then, the operation flow is jumped to the position immediately before the step S15.

At this time, the determination result signal having an instruction of "executing the normal mode" is automatically outputted by the state determination section 110 and as a result, the normal mode execution section 130 is activated by the operation mode control section 120. In this way, the operation mode of the coin discrimination apparatus 200 is changed from the leaning mode to the normal mode (step S15). In response to this, the series of the operations of the normal mode show in FIG. 7 are executed by the normal mode execution section 130 (step S16). In this way, the coin discrimination apparatus 200 is operated in accordance with the operation flow shown in FIG. 7.

As clearly understood from the aforementioned explanations, with the coin discrimination apparatus 200, the ordinary coin depositing/dispensing operation (a series of the operations of the normal mode) is carried out using the circulating coins at the installation location of the coin depositing/dispensing machine 300 even if the leaning mode is being executed. In this stage, the content of the coin depositing/dispensing machine 300 is "in the available state", in other words, "in operation" is displayed on the state display section 204. This displaying operation is carried out by the normal mode execution section 130 or the leaning mode execution section 140 that realizes the currently-activated operation mode.

Teaching Mode

Next, the teaching mode of the coin discrimination apparatus 200 will be explained. The teaching mode is realized by the teaching mode execution section 150 shown in FIG. 5. The operation flow of this mode is shown in FIG. 8. Since the teaching mode is prepared considering the fact that a service engineer in charge may conduct a teaching operation manually for the apparatus 200, it is needless to say that the teaching mode may be omitted if such situations do not occur.

Figure 6:
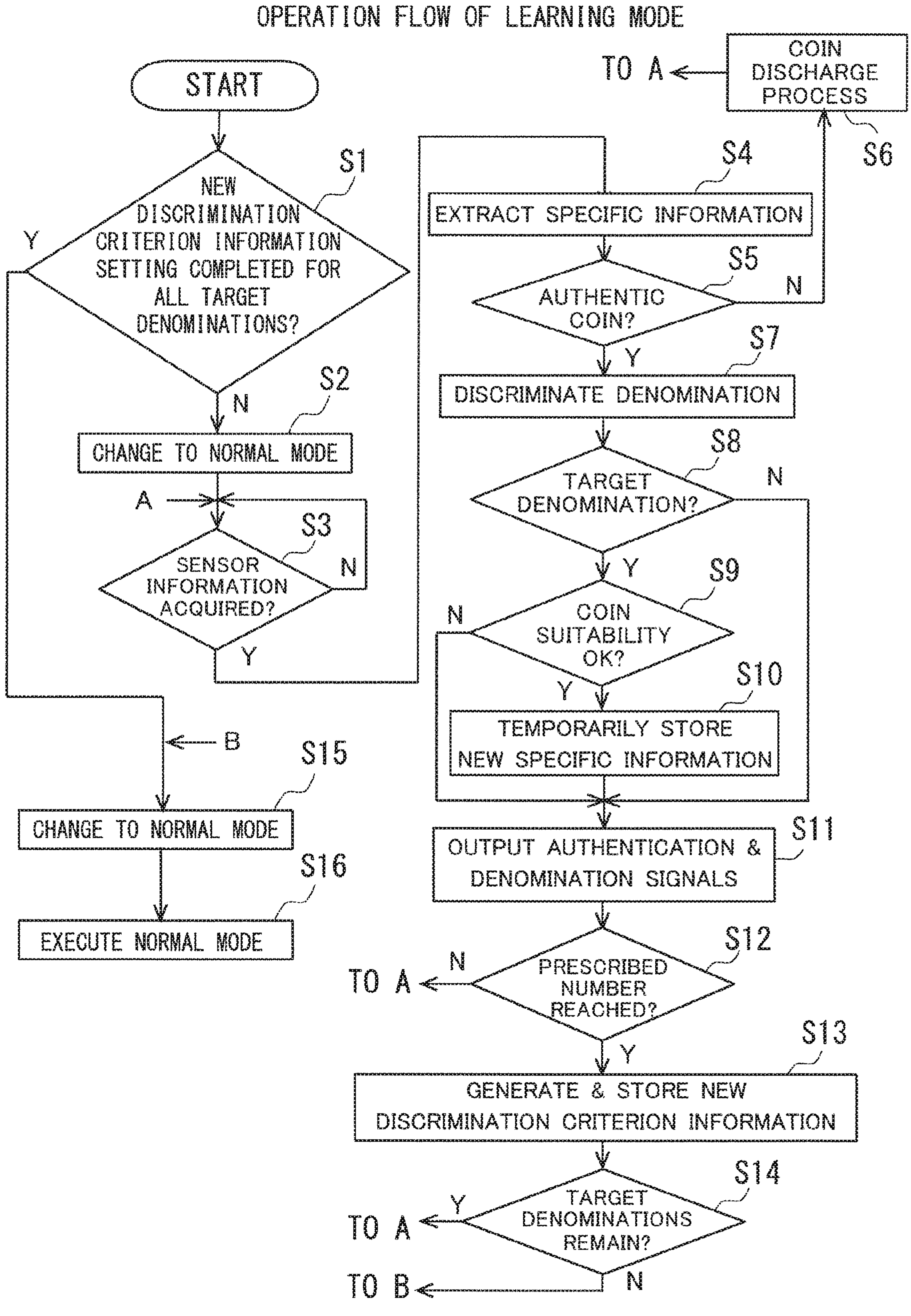
FIG. 6 is a flowchart showing a set of actions in the learning mode, which are conducted by the learning mode execution section in the coin discrimination system of FIG. 2.
Figure 7:
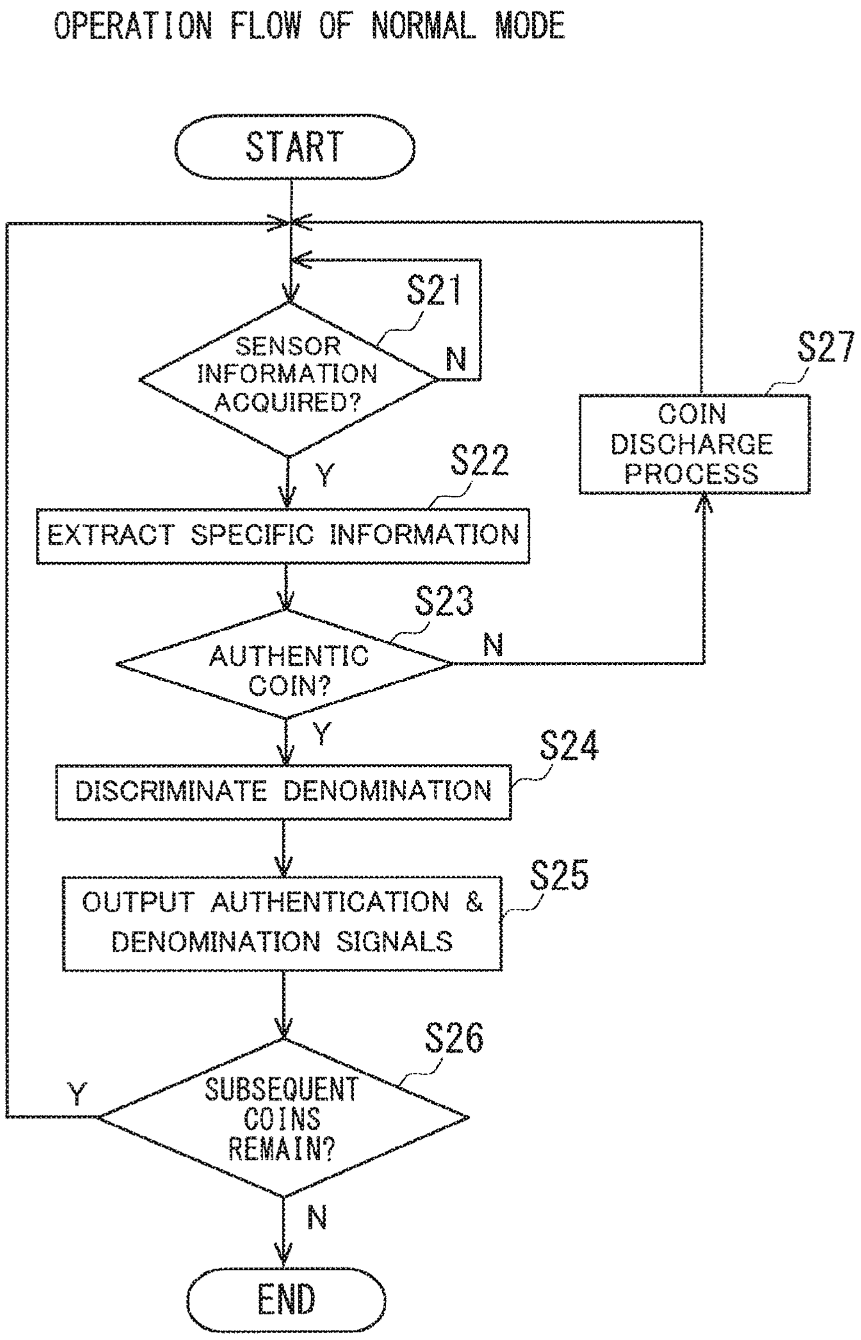
FIG. 7 is a flowchart showing a set of actions in the normal mode, which are conducted by the normal mode execution section in the coin discrimination system of FIG. 2.
Figure 8:
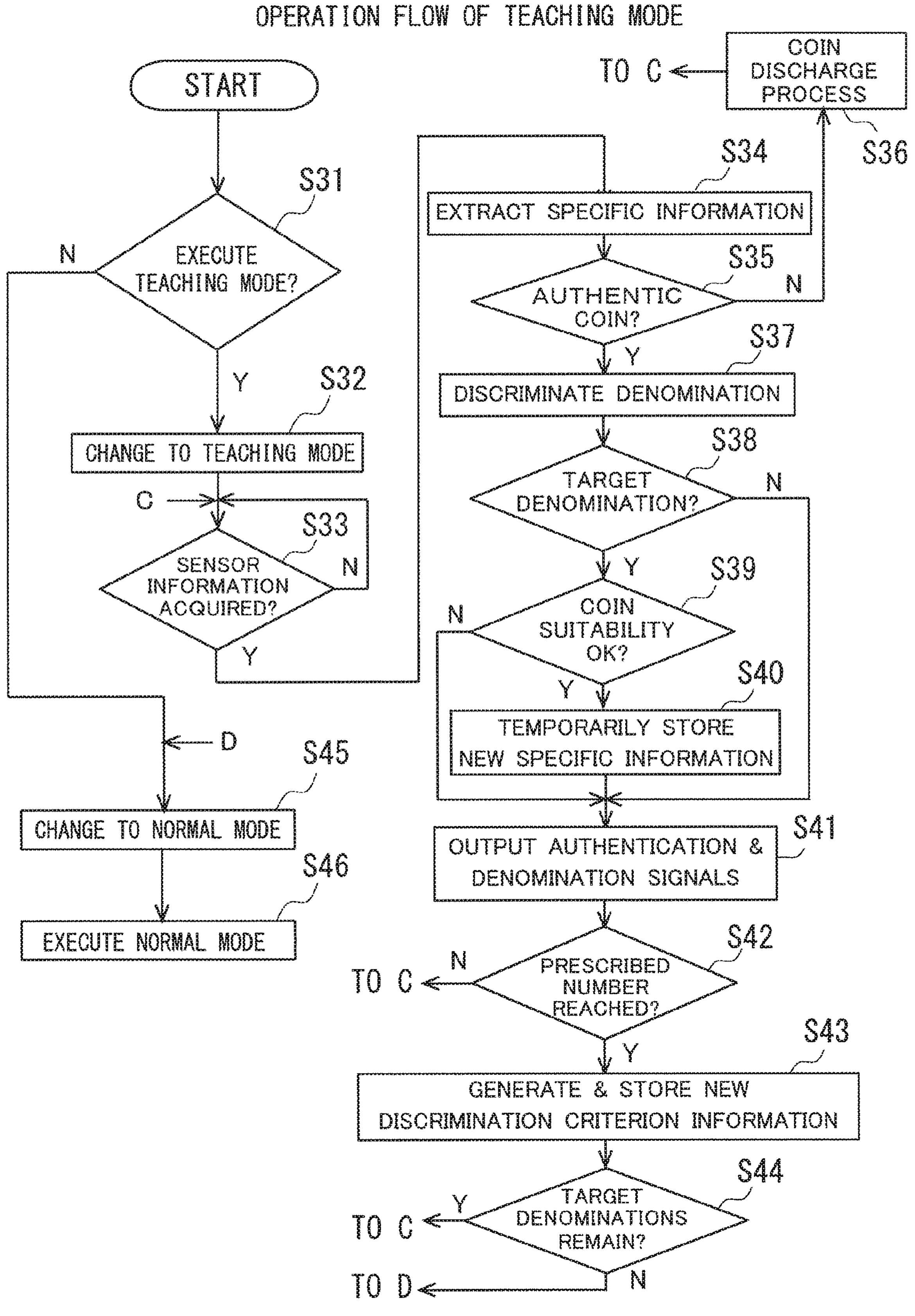
FIG. 8 is a flowchart showing a set of actions in the teaching mode, which are conducted by the teaching mode execution section in the coin discrimination system of FIG. 2.

The step S31 to the step S46 in the teaching mode of FIG. 8 are the same as the step S2 to the step S16 in the learning mode of FIG. 6 except that the step S31 of judging whether or not the teaching mode is executed is prepared instead of the step S1 in the learning mode, i.e., the step of judging whether or not new discrimination criterion information for the target denomination(s) of coins 30 is set. Accordingly, only the step S31 as the different point will be explained below while omitting the explanation about the same operations for the sake of simplification.

In the step S31 in the teaching mode, whether or not the teaching mode is executed is judged. This is because the coin discrimination apparatus 200 is configured in such a way that the teaching mode can be manually chosen taking the fact that a service engineer in charge may conduct a teaching operation manually to teach new discrimination criterion information into consideration. The teaching mode selection screen display subsection 158 is added to the teaching mode execution section 150 for this purpose.

In the step S31, a predetermined teaching mode selection screen, which is shown in FIG. 15, is displayed on the state display section 204 by the teaching mode selection screen display subsection 158. If a service engineer in charge who looks at the teaching mode selection screen makes an instruction to execute the teaching mode, the coin discrimination apparatus 200 changes its operation mode to the teaching mode (step S32) and then, executes the series of operations of the step S33 to the step S46 for the teaching mode. In this stage, the leaning mode is executed manually using a predetermined number of dedicated learning coins for leaning new discrimination criterion information. Through the series of operations of the learning mode thus executed, new discrimination criterion information for the predetermined denomination(s) can be additionally set in the same way as that of the above-described learning mode.

On the other hand, in the step S31, if the service engineer makes an instruction not to execute the teaching mode, the operation flow of the coin discrimination apparatus 200 is jumped to the step S45 and the operation mode of the apparatus 200 is changed from the initial state to the normal mode (step S45). In response to this, the normal mode shown in FIG. 7 is started by the normal mode execution section 130. After that, the series of operation of the normal mode are executed by the normal mode execution section 130 (step S46).

In addition, if the service engineer brings the predetermined number of the dedicated learning coins and uses these learning coins in the operation flow of the teaching mode shown in FIG. 8, the step S35 of judging the authentic coins (authentication discrimination) and the step S39 of judging the coin suitability can be omitted.

Implementation Forms

Next, the implementation or realization forms of the coin discrimination system 100 according to the embodiment of the present invention having the aforementioned structures and functions will be explained below.

The coin discrimination system 100 according to the embodiment of the present invention may be configured by software (firmware) alone or the combination of software and hardware. If the system 100 can be incorporated into the control section 210 of the coin discrimination apparatus 200, the system 100 may be implemented or realized in any form.

In the case where it is necessary to additionally set new discrimination criterion information for a designated target denomination in an existing coin depositing/dispensing machine 300, the coin discrimination system 100 incorporated into the control section 210 of the coin discrimination apparatus 200 needs to be actuated to execute the learning mode. However, if the coin discrimination system 100 is not incorporated into the control section 210 of the apparatus 200 of the existing machine 300, it is impossible to execute the learning mode. Accordingly, as previously explained in BACKGROUND OF THE INVENTION, it is necessary for a service engineer in charge to visit the installation location of the existing machine 300 and to exchange the existing coin discrimination apparatus 200 built in this machine 300 for a new coin discrimination apparatus in which new discrimination criterion information has been additionally set; alternatively, it is necessary for the same service engineer to manually update the firmware for controlling the existing coin discrimination apparatus 200 and to manually conduct the teaching operation using the updated firmware, thereby additionally setting new discrimination criterion information.

With the coin discrimination system 100 according to the embodiment of the present invention, however, the aforementioned inconvenience can be eliminated. Specifically, similar to the aforementioned embodiment of the present invention, if the coin discrimination system 100 is configured by software alone, in other words, if the system 100 is configured in the form of firmware for controlling the coin discrimination apparatus 200, the coin discrimination system 100 can be easily incorporated into the control section 210 of the existing coin discrimination apparatus 200 by, for example, asking the administrator of the coin depositing/dispensing machine 300 to download the firmware of the coin discrimination system 100 and to install the firmware thus downloaded so as to overwrite the existing firmware. (The part in which the firmware of the control section 210 is stored is usually formed using a rewritable memory device such as an EEPROM and therefore, there arises no problem about the implementation or realization.) If the system update control section 160 is configured in such a way that the leaning mode shown in FIG. 6 will be automatically started immediately after the coin discrimination system 100 as the firmware is incorporated into the control section 210 of the existing coin discrimination apparatus 200 in the aforementioned way, the learning mode is automatically executed and as a result, the new discrimination criterion information will be able to be additionally set automatically while conducting the ordinary authentication discrimination and ordinary denomination discrimination. In this case, the teaching mode can be omitted.

Alternatively, in the state where the coin depositing/dispensing machine 300 is always connected to the Internet, an instruction to automatically download the firmware of the coin discrimination system 100 by way of the Internet and to automatically install the firmware thus downloaded so as to overwrite the existing firmware may be previously written into the system update control section 160 of the system 100 as the firmware on the supplier side of the machine 300. In this case, the learning mode is automatically executed quickly without giving the administrator trouble and thus, the new discrimination criterion information will be able to be additionally set while conducting the ordinary authentication discrimination and ordinary denomination discrimination. This type is the easiest and most convenient. In this case also, the teaching mode can be omitted.

Furthermore, the coin discrimination system 100 according to the embodiment of the present invention may be configured as a unit or chip formed by the combination of hardware and software. In other words, the system 100 may be configured as a unit or chip as hardware into which software is written. In this case, however, delivery of the unit or chip to users will be necessary and exchange of the delivered unit or chip by the administrator or the like also will be necessary, which means that this type is slightly inconvenient compared with the aforementioned type where the whole system 100 is formed by software, i.e., firmware.

Once the coin discrimination system 100 is incorporated into the control section 210 of the coin discrimination apparatus 200 in the existing coin depositing/dispensing machine 300, the updated firmware of the system 100 will be automatically downloaded via the Internet and the firmware thus downloaded will be automatically installed so as to overwrite the existing firmware due to the operation of the system update control section 160 of the system 100. For this reason, even if additional setting of new discrimination criterion information to any of the denominations of coins is required after that, the additional setting thus required will be able to be carried out whenever necessary by previously writing an instruction of automatic updating of the firmware and an instruction of automatic execution of the learning mode into the system 100.

In addition, the coin discrimination method according to the present invention corresponds to the method executed by the aforementioned coin discrimination system 100. The coin discrimination computer readable medium according to the present invention corresponds to the computer readable medium in which the program stored therein executes the method executed by the aforementioned coin discrimination system 100 or implements or realizes the respective functions of the aforementioned coin discrimination system 100. The form of these programs is not limited. These programs may be configured in the form of such firmware as described above or in any form other than firmware. If these programs can be incorporated into the control section 210 of the coin discrimination apparatus 200, they may be formed in any type of program.

With the coin discrimination system 100 according to the embodiment of the present invention, as explained in detail, one of the normal mode execution section 130, the learning mode execution section 140, and the teaching mode execution section 150 can be alternatively activated using the state determination section 110, and the learning mode execution section 140 comprises:

(a) the sensor information acquisition subsection 141, the specific information extraction subsection 142, the authenticity discrimination subsection 143, and the denomination discrimination subsection 144 as the authentication and denomination discrimination means for conducting authentication discrimination and denomination discrimination of coins 30 by comparing respectively the first, second, and third specific information with the first, second, and third discrimination criterion information;

(b) the target denomination discrimination subsection **144*a* and the coin suitability discrimination subsection 145 as the coin selection means for selecting the new criterion information setting coins (i.e., coins that are suitable for generating new discrimination criterion information) through the first judgement on whether or not a current target coin 30 has one of the target denominations and the second judgment on whether or not the current target coin 30** is suitable for generating the new discrimination criterion information;

(c) the new specific information extraction subsection 146 as the new specific information extraction means for extracting the new specific information from at least one of the first, second, and third sensor information about the new criterion information setting coins by the predetermined method; and (d) the new discrimination criterion information setting subsection 147 as the new discrimination criterion information setting means for setting the new discrimination criterion information for the target denominations using the new specific information extracted by the new specific information extraction subsection 146.

Accordingly, the ordinary authentication discrimination and the ordinary denomination discrimination of the coins 30 can be performed by the sensor information acquisition subsection 141, the specific information extraction subsection 142, the authenticity discrimination subsection 143, and the denomination discrimination subsection 144 and therefore, the circulating coins (the coins that circulate currently in the market) can be selectively used as the teaching coins. This means that dedicated teaching coins (coins that are dedicated to teaching) are unnecessary for additionally setting the new discrimination criterion information of the target denominations. However, the circulating coins are often worn down, damaged, and/or modified during circulation or use and as a result, they include the coins 30 whose size and/or physical properties have been deviated from those of the newly produced ones.

Thus, the new discrimination criterion information setting coins are selected from the coins 30 through the first judgement on whether the denomination of each of the coins 30 is consistent with the target denomination and the second judgement on whether each of the coins 30 is suitable for generation of the new discrimination criterion information using the target denomination discrimination subsection **144*a* and the coin suitability discrimination subsection 145 while conducting the authentication discrimination and the denomination discrimination using the subsections 141, 142, 143, and 144**.

Thereafter, the new specific information is extracted from at least one of the first to third sensor information about the new discrimination criterion information setting coins selected in the aforementioned manner by the new specific information extraction subsection 146. Moreover, the new discrimination criterion information for the target denominations is set using the new specific information by the new discrimination criterion information setting subsection 147.

In this way, additionally setting the new discrimination criterion information for the target denominations to the current or existing first to third discrimination criterion information can be realized while conducting the normal or ordinary operations for authenticity discrimination and denomination discrimination about the circulating coins.

Accordingly, with the coin discrimination system 100 according to the embodiment of the present invention, the task of visiting the installation location of an existing coin depositing/dispensing machine 300 to exchange the existing coin discrimination apparatus 200 incorporated in the machine 300 for a new one and the task of additionally setting a new coin discrimination criterion or criteria manually to the existing coin discrimination apparatus 200 can be eliminated.

Moreover, it is unnecessary to stop the ordinary coin discrimination operation of an existing coin discrimination apparatus 200 for the purpose of additionally setting new coin discrimination criterion information. In other words, additionally setting of new discrimination criterion information for a desired target denomination or denominations can be realized while conducting the authenticity discrimination and the denomination discrimination of circulating coins, i.e., conducting the normal operation.

Furthermore, since new discrimination criterion information for a desired denomination or denominations can be added to an existing coin discrimination apparatus 200 easily and quickly, it is possible to cope with the need of raising the accuracy of authenticity discrimination as occasion may demand by simply designating the denomination(s) that require(s) additional setting of new discrimination criterion information and the method for extracting new specific information from the first to third sensor information, whenever additional setting of the new discrimination criterion information is required.

Further in addition, when the series of operations of the learning mode is completed, the series of operations of the normal mode is executed and thus, the ordinary operation can be started immediately after the additional setting of the new discrimination criterion information to the desired target denomination(s) is completed.

Variations

The aforementioned embodiment is an exemplary embodied example of the present invention. Thus, it is needless to say that the present invention is not limited to the embodiment and any other modification is applicable to the embodiment without departing the spirit of the invention.

For example, in the aforementioned embodiment, the new discrimination criterion information for each target denomination is generated by averaging the first to third specific information about the new discrimination criterion information setting coins for every prescribed number of coins after the first to third specific information about the prescribed number of coins is collected. However, the present invention is not limited to this. For example, the following method may be used. Specifically, a dummy or temporary specific information is generated and stored in the stage where the first to third specific information about the first coin 30 of one of the target denominations is acquired. Next, a dummy or temporary specific information is generated and stored in the stage where the first to third specific information about the second coin 30 of the same target denomination is acquired and then, an average of these two dummy specific information is calculated to generate another dummy specific information. Thereafter, the same processing as above is applied to the dummy specific information about the second and third coins 30. Subsequently, the same processing is repeated until the number of the processed coins 30 reaches the predetermined number (e.g., 30), thereby generating and storing the final specific information. Then, the final specific information thus generated and stored is added as the new discrimination criterion information.

Moreover, in the aforementioned embodiment, as the target denomination that requires additional setting of new discrimination criterion information, two denominations of 50 YEN and 100 YEN are assumed. However, the present invention is not limited to this. The number of the target denominations may be one or three or more. It is needless to say that the coin 30 to be discriminated may be any coin other than Japanese Yen.

Furthermore, in the aforementioned embodiment, the first, second, and third coin sensors 20*a*, 20*b*, and 20*c* detect the material, thickness, and diameter of coins 30, respectively; however, the present invention is not limited to this. The total number of the coins may be changed according to the necessity. For example, if the range of the diameter of coins 30 to be discriminated is wide, a plurality of diameter sensors need to be used; this is similarly applicable to the case where the range(s) of the material and/or thickness of coins 30 to be discriminated is/are wide. If any character of coins 30 other than the material, thickness, and diameter needs to be detected, the total number of the coin sensors will be larger according to the necessity such as a fourth coin sensor, a fifth coin sensor and so on. The present invention covers all the cases, in which no limitation is applied to the total number of coin sensors.

Figure 14:
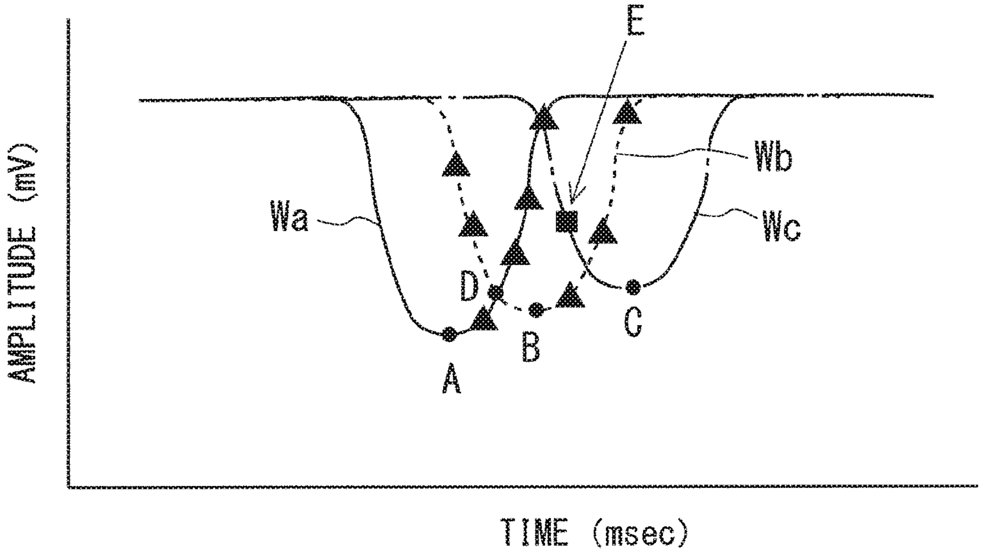
FIG. 14 is an explanatory drawing showing points that can be used as a piece of new specific information in the coin discrimination apparatus of FIG. 1, in which the points are located on the three output signal waveforms obtained from the first to third coin sensors shown in FIG. 12.

Furthermore, in the aforementioned embodiment, the new specific information is given by the value at the intersection of the two waveforms of the first and second sensor information, at which the first and second sensor information have the same amplitude (voltage) value (the point D in FIG. 12). However, needless to say, any point other than the point D may be used as the new specific information. If a particular type of sensor information has a difference in waveform between the authentic coin and the counterfeit coin, the difference can be used for the new specific information, in which there is no limitation. For example, the point E shown by the square dot in FIG. 14 shows the value of the waveform signal Wc, which is raised by a fixed value from the minimum value of the amplitude (voltage) of the waveform signal Wb. This point E may be used for the new specific information. It is needless to say that several points indicated by the triangular dots in FIG. 14 may be used for the new specific information.

INDUSTRIAL APPLICABILITY

The coin discrimination method, system, and computer readable medium according to the present invention are applicable not only to coins as currency but also coin equivalents such as token and medals. Moreover, the coin discrimination method, system, and computer readable medium according to the present invention may be used for not only improvement of the accuracy of the authentication discrimination of coins but also improvement of the accuracy of the denomination discrimination of coins.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A coin discrimination method for setting a piece of new discrimination criterion information for a predetermined target denomination while conducting authenticity discrimination and denomination discrimination of coins using pieces of sensor information outputted from coin sensors, comprising:

providing a coin discrimination apparatus having a memory, wherein the coin discrimination apparatus includes a state determination section and an operation mode controller;

comparing respectively pieces of specific information obtained from the pieces of sensor information from the coin sensors that detect coins with pieces of current discrimination criterion information, thereby conducting authenticity discrimination and denomination discrimination of the coins in a normal mode;

setting the predetermined target denomination so as not to include at least one other denomination of the coins that is subjected to authenticity discrimination and denomination discrimination by designating a coin as the predetermined target denomination in the memory in advance of conducting authenticity discrimination and denomination discrimination of the coins, wherein only a detection of a presence of the predetermined target denomination initiates a nonstandard mode for determining whether the setting of the piece of new discrimination criterion information is required, wherein in response to content of a determination result signal outputted from the state determination section to the operation mode controller based upon the denomination encountered, the operation mode controller outputs a mode selection signal that automatically switches between the normal mode and the nonstandard mode, wherein, after performing authenticity discrimination and denomination discrimination on the predetermined target denomination that requires setting of the piece of new discrimination criterion information, selecting new discrimination criterion information setting coins from the coins through a first judgement on whether a denomination of each of the coins is consistent with the predetermined target denomination and a second judgement on whether each of the coins is suitable for generation of the piece of new discrimination criterion information in order to select the coins each having a size and a physical property that is within a permitted range of those at a time of production, the second judgement being conducted by determining whether each of the pieces of specific information is included in a permissible range of a corresponding one of pieces of suitability criterion information;

extracting a piece of new specific information from at least one of the pieces of sensor information about the new discrimination criterion information setting coins;

setting the piece of new discrimination criterion information for the predetermined target denomination using the piece of new specific information after a predetermined plural number of the new discrimination criterion information setting coins have been judged in the first judgment to be consistent with the predetermined target denomination and in the second judgment to be in the permissible range of the corresponding one of pieces of suitability criterion information.

2. The coin discrimination method according to claim 1, wherein the piece of new discrimination criterion information for the predetermined target denomination is generated by averaging the new pieces of specific information about the new discrimination criterion information setting coins.

3. The coin discrimination method according to claim 1, wherein when the setting of the piece of new discrimination criterion information of the predetermined target denomination is completed, the authenticity discrimination of coins is conducted using the pieces of current discrimination criterion information and the piece of new discrimination criterion information with respect to coins that will be subjected to coin discrimination subsequently without conducting the selection of the new discrimination criterion information setting coins, the extraction of the piece of new specific information, and the setting of the piece of new discrimination criterion information; and wherein the denomination discrimination of coins is conducted using the pieces of current discrimination criterion information.

4. The coin discrimination method according to claim 1, wherein the nonstandard mode is a learning mode where the selection of the new discrimination criterion information setting coins, the extraction of the piece of new specific information, and the setting of the piece of new discrimination criterion information are conducted while conducting the authentication discrimination and the denomination discrimination of coins;

where, in the normal mode, the authentication discrimination and the denomination discrimination of coins are conducted without conducting the selection of the new discrimination criterion information setting coins, the extraction of the piece of new specific information, and the setting of the piece of new discrimination criterion information;

when the setting of the piece of new discrimination criterion information is completed, the learning mode is automatically switched to the normal mode; and in the normal mode, the authentication discrimination is conducted using the pieces of the current discrimination criterion information and the piece of new discrimination criterion information, and the denomination discrimination is conducted using the pieces of the current discrimination criterion information.

5. The coin discrimination method according to claim 1, wherein the nonstandard mode is a learning mode where the selection of the new discrimination criterion information setting coins, the extraction of the piece of new specific information, and the setting of the piece of new discrimination criterion information are conducted while conducting the authentication discrimination and the denomination discrimination of coins;

where, in the normal mode, the authentication discrimination and the denomination discrimination of coins are conducted without conducting the selection of the new discrimination criterion information setting coins, the extraction of the piece of new specific information, and the setting of the piece of new discrimination criterion information;

whether or not the piece of the new discrimination criterion information has been stored in a predetermined information storing section is searched before the learning mode and the normal mode begins; and the normal mode begins when it is judged that the piece of the new discrimination criterion information has been stored, and the learning mode begins when it is judged that the piece of the new discrimination criterion information has not been stored.

6. The coin discrimination method according to claim 1, wherein the nonstandard mode is a teaching mode where the selection of the new discrimination criterion information setting coins, the extraction of the piece of new specific information, and the setting of the piece of new discrimination criterion information are conducted while conducting the authentication discrimination and the denomination discrimination of coins;

where, in the normal mode, the authentication discrimination and the denomination discrimination of coins are conducted without conducting the selection of the new discrimination criterion information setting coins, the extraction of the piece of new specific information, and the setting of the piece of new discrimination criterion;

a teaching mode selection screen is displayed on a predetermined state display section before the teaching mode and the normal mode begins; and the teaching mode begins when an instruction to select the teaching mode is given on the teaching mode selection screen, and the normal mode begins when an instruction not to select the teaching mode is given on the teaching mode selection screen.

7. A coin discrimination system for setting a piece of new discrimination criterion information for a predetermined target denomination while conducting authenticity discrimination and denomination discrimination of coins using pieces of sensor information outputted from coin sensors, comprising:

a coin discrimination apparatus having a memory, wherein the coin discrimination apparatus includes a state determination section and an operation mode controller;

an authenticity and denomination discrimination controller that conducts authenticity discrimination and denomination discrimination of the coins in a normal mode by respectively comparing pieces of specific information obtained from the pieces of sensor information from the coin sensors that detect coins with corresponding pieces of current discrimination criterion information;

setting the predetermined target denomination so as not to include at least one other denomination of the coins that is subjected to authenticity discrimination and denomination discrimination by designating a coin as the predetermined target denomination in the memory in advance of conducting authenticity discrimination and denomination discrimination of the coins, wherein only a detection of a presence of the predetermined target denomination initiates a nonstandard mode for determining whether the setting of the piece of new discrimination criterion information is required, wherein in response to content of a determination result signal outputted from the state determination section to the operation mode controller based upon the denomination encountered, the operation mode controller outputs a mode selection signal that automatically switches between the normal mode and the nonstandard mode, wherein, after performing authenticity discrimination and denomination discrimination on the predetermined target denomination that requires setting of a piece of new discrimination criterion information, a coin selection controller selects new discrimination criterion setting coins from the coins through a first judgement on whether a denomination of each of the coins is consistent with the predetermined target denomination and a second judgement on whether each of the coins is suitable for generation of the piece of new discrimination criterion information in order to select the coins each having a size and a physical property that is within a permitted range of those at a time of production, the second judgement being conducted by determining whether each of the pieces of specific information is included in a permissible range of a corresponding one of pieces of suitability criterion information;

a new specific information extraction controller that extracts a piece of new specific information from at least one of the pieces of the sensor information about the new discrimination criterion information setting coins; and a new discrimination criterion information setting controller that sets the piece of new discrimination criterion information for the predetermined target denomination using the piece of new specific information after a predetermined plural number of the new discrimination criterion information setting coins have been judged in the first judgment to be consistent with the predetermined target denomination and in the second judgment to be in the permissible range of the corresponding one of pieces of suitability criterion information.

8. The coin discrimination system according to claim 7, wherein the piece of new discrimination criterion information for the predetermined target denomination is generated by averaging the new pieces of specific information about the new discrimination criterion information setting coins.

9. The coin discrimination system according to claim 7, wherein when the setting of the piece of new discrimination criterion information of the predetermined target denomination is completed, the authenticity discrimination of coins is conducted using the pieces of current discrimination criterion information and the piece of new discrimination criterion information with respect to coins that will be subjected to coin discrimination subsequently without conducting the selection of the new discrimination criterion information setting coins, the extraction of the piece of new specific information, and the setting of the piece of new discrimination criterion information; and the denomination discrimination of coins is conducted using the pieces of current discrimination criterion information.

10. The coin discrimination system according to claim 7, wherein the nonstandard mode is a learning mode where the selection of the new discrimination criterion information setting coins, the extraction of the piece of new specific information, and the setting of the piece of new discrimination criterion information are conducted while conducting the authentication discrimination and the denomination discrimination of coins; and where, in the normal mode, the authentication discrimination and the denomination discrimination of coins are conducted without conducting the selection of the new discrimination criterion information setting coins, the extraction of the piece of new specific information, and the setting of the piece of new discrimination criterion information;

when the setting of the piece of new discrimination criterion information is completed, the learning mode is automatically switched to the normal mode; and in the normal mode, the authentication discrimination is conducted using the pieces of the current discrimination criterion information and the piece of new discrimination criterion information, and the denomination discrimination is conducted using the pieces of the current discrimination criterion information.

11. The coin discrimination system according to claim 7, wherein the nonstandard mode is a learning mode where the selection of the new discrimination criterion information setting coins, the extraction of the piece of new specific information, and the setting of the piece of new discrimination criterion information are conducted while conducting the authentication discrimination and the denomination discrimination of coins;

where, in the normal mode, the authentication discrimination and the denomination discrimination of coins are conducted without conducting the selection of the new discrimination criterion information setting coins, the extraction of the piece of new specific information, and the setting of the piece of new discrimination criterion information;

whether or not the piece of the new discrimination criterion information has been stored in a predetermined information storing section is searched before the learning mode and the normal mode begins; and the normal mode begins when it is judged that the piece of the new discrimination criterion information has been stored, and the learning mode begins when it is judged that the piece of the new discrimination criterion information has not been stored.

12. The coin discrimination system according to claim 7, wherein the nonstandard mode is a teaching mode where the selection of the new discrimination criterion information setting coins, the extraction of the piece of new specific information, and the setting of the piece of new discrimination criterion information are conducted while conducting the authentication discrimination and the denomination discrimination of coins;

where, in the normal mode, the authentication discrimination and the denomination discrimination of coins are conducted without conducting the selection of the new discrimination criterion information setting coins, the extraction of the piece of new specific information, and the setting of the piece of new discrimination criterion information;

a teaching mode selection screen is displayed on a predetermined state display section before the teaching mode and the normal mode begins; and the teaching mode begins when an instruction to select the teaching mode is given on the teaching mode selection screen, and the normal mode begins when an instruction not to select the teaching mode is given on the teaching mode selection screen.

13. A non-transitory computer readable medium storing a coin discrimination program for setting a piece of new discrimination criterion information for a predetermined target denomination while conducting authenticity discrimination and denomination discrimination of coins using pieces of sensor information outputted from coin sensors, which comprises processes to be executed by a computer, the processes comprises:

accessing a memory;

comparing respectively pieces of specific information obtained from the pieces of sensor information from the coin sensors that detect coins with corresponding pieces of current discrimination criterion information, thereby conducting authenticity discrimination and denomination discrimination of the coins in a normal mode;

setting the predetermined target denomination so as not to include at least one other denomination of the coins that is subjected to authenticity discrimination and denomination discrimination by designating a coin as the predetermined target denomination in the memory in advance of conducting authenticity discrimination and denomination discrimination of the coins, wherein only a detection of a presence of the predetermined target denomination initiates a nonstandard mode for determining whether the setting of the piece of new discrimination criterion information is required, causing an operation mode controller to output a mode selection signal that automatically switches between the normal mode and the nonstandard mode in response to content of a determination result signal outputted from the state determination section to the operation mode controller based upon the denomination encountered, wherein, after performing authenticity discrimination and denomination discrimination on the predetermined target denomination that requires setting of a piece of new discrimination criterion information, selecting new discrimination criterion information setting coins from the coins through a first judgement on whether a denomination of each of the coins is consistent with the predetermined target denomination and a second judgement on whether each of the coins is suitable for generation of the piece of new discrimination criterion information in order to select the coins each having a size and a physical property that is within a permitted range of those at a time of production, the second judgement being conducted by determining whether each of the pieces of specific information is included in a permissible range of a corresponding one of pieces of suitability criterion information;

extracting a piece of new specific information from at least one of the pieces of the sensor information about the new discrimination criterion information setting coins; and setting the piece of new discrimination criterion information for the predetermined target denomination using the piece of new specific information after a predetermined plural number of the new discrimination criterion information setting coins have been judged in the first judgment to be consistent with the predetermined target denomination and in the second judgment to be in the permissible range of the corresponding one of pieces of suitability criterion information.

14. The non-transitory computer readable medium according to claim 13, wherein the piece of new discrimination criterion information for the predetermined target denomination is generated by averaging the new pieces of specific information about the new discrimination criterion information setting coins.

15. The non-transitory computer readable medium according to claim 13, wherein when the setting of the piece of new discrimination criterion information of the predetermined target denomination is completed, the authenticity discrimination of coins is conducted using the pieces of current discrimination criterion information and the piece of new discrimination criterion information with respect to coins that will be subjected to coin discrimination subsequently without conducting the selection of the new discrimination criterion information setting coins, the extraction of the piece of new specific information, and the setting of the piece of new discrimination criterion information; and the denomination discrimination of coins is conducted using the pieces of current discrimination criterion information.

16. The non-transitory computer readable medium according to claim 13, wherein the nonstandard mode is a learning mode where the selection of the new discrimination criterion information setting coins, the extraction of the piece of new specific information, and the setting of the piece of new discrimination criterion information are conducted while conducting the authentication discrimination and the denomination discrimination of coins;

where, in the normal mode, the authentication discrimination and the denomination discrimination of coins are conducted without conducting the selection of the new discrimination criterion information setting coins, the extraction of the piece of new specific information, and the setting of the piece of new discrimination criterion information;

when the setting of the piece of new discrimination criterion information is completed, the learning mode is automatically switched to the normal mode; and in the normal mode, the authentication discrimination is conducted using the pieces of the current discrimination criterion information and the piece of new discrimination criterion information, and the denomination discrimination is conducted using the pieces of the current discrimination criterion information.

17. The non-transitory computer readable medium according to claim 13, wherein the nonstandard mode is a learning mode where the selection of the new discrimination criterion information setting coins, the extraction of the piece of new specific information, and the setting of the piece of new discrimination criterion information are conducted while conducting the authentication discrimination and the denomination discrimination of coins;

where, in the normal mode, the authentication discrimination and the denomination discrimination of coins are conducted without conducting the selection of the new discrimination criterion information setting coins, the extraction of the piece of new specific information, and the setting of the piece of new discrimination criterion information;

whether or not the piece of the new discrimination criterion information has been stored in a predetermined information storing section is searched before the learning mode and the normal mode begins; and the normal mode begins when it is judged that the piece of the new discrimination criterion information has been stored, and the learning mode begins when it is judged that the piece of the new discrimination criterion information has not been stored.

18. The non-transitory computer readable medium according to claim 13, wherein the nonstandard mode is a teaching mode where the selection of the new discrimination criterion information setting coins, the extraction of the piece of new specific information, and the setting of the piece of new discrimination criterion information are conducted while conducting the authentication discrimination and the denomination discrimination of coins;

where, in the normal mode, the authentication discrimination and the denomination discrimination of coins are conducted without conducting the selection of the new discrimination criterion information setting coins, the extraction of the piece of new specific information, and the setting of the piece of new discrimination criterion information is defined as a normal mode;

a teaching mode selection screen is displayed on a predetermined state display section before the teaching mode and the normal mode begins; and the teaching mode begins when an instruction to select the teaching mode is given on the teaching mode selection screen, and the normal mode begins when an instruction not to select the teaching mode is given on the teaching mode selection screen.

19. The coin discrimination method according to claim 1, wherein the predetermined target denomination is one denomination of a plurality of denominations, and the piece of new discrimination criterion information is only set for the predetermined target denomination and not set for other denominations besides the predetermined target denomination of the plurality of denominations.

20. The coin discrimination method according to claim 1, wherein the permissible range of the corresponding one of pieces of suitability criterion information is generated by narrowing a permissible range of a corresponding one of pieces of current discrimination criterion information of the predetermined target denomination.

21. The coin discrimination method according to claim 20, wherein the permissible range of the corresponding one of pieces of suitability criterion information is generated by respectively multiplying the pieces of current discrimination criterion information of the predetermined target denomination by a predetermined ratio which is less than one.

22. The coin discrimination system according to claim 7, wherein the predetermined target denomination is one denomination of a plurality of denominations, and the piece of new discrimination criterion information is only set for the predetermined target denomination and not set for other denominations besides the predetermined target denomination of the plurality of denominations.

23. The coin discrimination system according to claim 7, wherein the permissible range of the corresponding one of pieces of suitability criterion information is generated by narrowing a permissible range of a corresponding one of pieces of current discrimination criterion information of the predetermined target denomination.

24. The coin discrimination system according to claim 23, wherein the permissible range of the corresponding one of pieces of suitability criterion information is generated by respectively multiplying the pieces of current discrimination criterion information of the predetermined target denomination by a predetermined ratio which is less than one.

25. The non-transitory computer readable medium according to claim 13, wherein the predetermined target denomination is one denomination of a plurality of denominations, and the piece of new discrimination criterion information is only set for the predetermined target denomination and not set for other denominations besides the predetermined target denomination of the plurality of denominations.

26. The non-transitory computer readable medium according to claim 13, wherein the permissible range of the corresponding one of pieces of suitability criterion information is generated by narrowing a permissible range of a corresponding one of pieces of current discrimination criterion information of the predetermined target denomination.

27. The non-transitory computer readable medium according to claim 26, wherein the permissible range of the corresponding one of pieces of suitability criterion information is generated by respectively multiplying the pieces of current discrimination criterion information of the predetermined target denomination by a predetermined ratio which is less than one.

28. The coin discrimination method according to claim 1, wherein the piece of new discrimination criterion information for the predetermined target denomination is set without using teaching coins that are prepared as coins dedicated for teaching.

29. The coin discrimination system according to claim 7, wherein the piece of new discrimination criterion information for the predetermined target denomination is set without using teaching coins that are prepared as coins dedicated for teaching.

30. The non-transitory computer readable medium according to claim 13, wherein the piece of new discrimination criterion information for the predetermined target denomination is set without using teaching coins that are prepared as coins dedicated for teaching.

* * * * *